United States Patent
Sugimoto et al.

(10) Patent No.: US 10,522,267 B2
(45) Date of Patent: Dec. 31, 2019

(54) WIRE HARNESS STRUCTURE

(71) Applicant: Yazaki Corporation, Tokyo (JP)

(72) Inventors: Terumitsu Sugimoto, Makinohara (JP); Mototatsu Matsunaga, Makinohara (JP); Tsuyoshi Uchikura, Makinohara (JP); Yoichi Maki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/057,158

(22) Filed: Aug. 7, 2018

(65) Prior Publication Data
US 2018/0342334 A1 Nov. 29, 2018

Related U.S. Application Data

(63) Continuation of application No. PCT/JP2017/006205, filed on Feb. 20, 2017.

(30) Foreign Application Priority Data

Feb. 22, 2016 (JP) .................................. 2016-031413

(51) Int. Cl.
*H01B 7/00* (2006.01)
*B60R 16/02* (2006.01)
(Continued)

(52) U.S. Cl.
CPC .......... *H01B 7/0045* (2013.01); *B60R 16/023* (2013.01); *B60R 16/0207* (2013.01); *B60R 16/03* (2013.01)

(58) Field of Classification Search
CPC combination set(s) only.
See application file for complete search history.

(56) References Cited

U.S. PATENT DOCUMENTS 3,700,786 A * 10/1972 Lawrenson .......... H01B 7/0045
174/72 A
3,984,622 A * 10/1976 Ross .................... H01B 7/0045
174/72 A
(Continued)

FOREIGN PATENT DOCUMENTS

CN 105313801 A 2/2016
CN 105322316 A 2/2016
(Continued)

OTHER PUBLICATIONS

International Search Report (PCT/ISA/210) dated Apr. 4, 2017 issued by the International Searching Authority in International Application No. PCT/JP2017/006205.
(Continued)

*Primary Examiner* — William H. Mayo, III
*Assistant Examiner* — Krystal Robinson
(74) *Attorney, Agent, or Firm* — Sughrue Mion, PLLC

(57) ABSTRACT

A wire harness structure includes a main harness that has a trunk harness routed on a vehicle, and has at least one branch harness having one end connected to the trunk harness as a branch and the other end electrically connected to an electrical device mounted on the vehicle; and a branch connection mechanism to which at least one additional electrical device mounted on the vehicle is electrically connected, and which is connected to the main harness in a retrofitting manner as a branch.

6 Claims, 18 Drawing Sheets

(51) Int. Cl.
*B60R 16/023* (2006.01)
*B60R 16/03* (2006.01)

(56) References Cited

U.S. PATENT DOCUMENTS

| | | | | | |
|---|---|---|---|---|---|
| 4,051,383 | A | * | 9/1977 | Dola | H01B 7/0045 307/11 |
| 4,577,917 | A | * | 3/1986 | Nashimoto | B62J 6/001 439/36 |
| 4,750,265 | A | * | 6/1988 | Watanabe | B60R 16/0207 29/854 |
| 4,815,984 | A | * | 3/1989 | Sugiyama | B60R 16/0239 174/72 A |
| 4,940,419 | A | * | 7/1990 | Kurita | H01R 13/5213 439/271 |
| 5,030,116 | A | * | 7/1991 | Sakai | F02M 51/005 123/456 |
| 5,252,091 | A | * | 10/1993 | Fujita | H01R 25/14 439/499 |
| 5,435,747 | A | * | 7/1995 | Franckx | H01R 4/2433 439/409 |
| 5,501,605 | A | * | 3/1996 | Ozaki | B60R 16/0207 174/72 A |
| 5,661,453 | A | * | 8/1997 | Justus | B60R 16/0215 340/438 |
| 5,690,505 | A | * | 11/1997 | Hirata | H01R 4/2433 439/402 |
| 5,903,156 | A | * | 5/1999 | Matsumaru | G01R 31/11 324/503 |
| 6,083,015 | A | * | 7/2000 | Vargas | B60R 16/0215 439/130 |
| 6,170,152 | B1 | * | 1/2001 | Ohta | H01R 43/01 29/33 M |
| 6,503,098 | B2 | * | 1/2003 | Aoki | B60R 16/0207 439/502 |
| 6,635,824 | B1 | * | 10/2003 | Oka | H01R 9/226 174/72 B |
| 7,179,101 | B2 | * | 2/2007 | Murakami | H01R 4/2433 439/142 |
| 2010/0218976 | A1 | * | 9/2010 | Suzuki | B60R 16/0215 174/135 |
| 2015/0349471 | A1 | * | 12/2015 | Maki | H01R 13/6691 307/10.1 |
| 2015/0360627 | A1 | | 12/2015 | Sasaki et al. | |
| 2019/0074641 | A1 | | 3/2019 | Maki et al. | |

FOREIGN PATENT DOCUMENTS

| | | | |
|---|---|---|---|
| JP | 8-251755 A | | 9/1996 |
| JP | 2929962 B2 | | 8/1999 |
| JP | 2002-260747 A | | 9/2002 |
| JP | 2012-6446 A | | 1/2012 |
| JP | 2013-112193 A | | 6/2013 |
| JP | 2015-227088 A | | 12/2015 |
| JP | 2016-4687 A | | 1/2016 |
| JP | 2016-15809 A | | 1/2016 |
| JP | 2016015809 A | * | 1/2016 |
| WO | 2009047923 A1 | | 4/2009 |

OTHER PUBLICATIONS

Written Opinion (PCT/ISA/237) dated Apr. 4, 2017 issued by the International Searching Authority in International Application No. PCT/JP2017/006205.
Communication dated Oct. 31, 2017, issued by the Japanese Patent Office in counterpart Japanese Application No. 2016-031413.
Translation of previously submitted Written Opinion (PCT/ISA/237) dated Apr. 4, 2017 in International Patent Application No. PCT/JP2017/006205.
Communication dated Apr. 2, 2019, from the State Intellectual Property Office of People's Republic of China in counterpart Application No. 201780012798.3.

* cited by examiner

WIRE HARNESS STRUCTURE

CROSS REFERENCE TO RELATED APPLICATIONS

This application is a continuation of PCT application No. PCT/JP2017/006205, which was filed on Feb. 20, 2017 based on Japanese Patent Application (No. 2016-031413) filed on Feb. 22, 2016, the contents of which are incorporated herein by reference.

BACKGROUND OF THE INVENTION

1. Field of the Invention

The present invention relates to a wire harness structure.

2. Description of the Related Art

Various additional electrical devices may be added as options etc. in a manufacturing process of a vehicle or after the manufacturing of the vehicle (see JP-A-2002-260747, JP-A-2012-6446 and JP-A-2013-112193). The additional electrical devices are connected to a wire harness (W/H) which can feed power supplied from a battery etc., a control signal for controlling the additional electrical devices, etc. In the background art, methods of coping with addition of an additional electrical device such as a load or a switch as an option etc. to this type of wire harness are roughly divided into two as follows.

One is a method in which two kinds of item numbers, i.e. a wire harness with an item number (A) and a wire harness with an item number (B) are prepared, as shown in FIG. 17. In the wire harness having the item number (A), an additional load or an additional SW (switch) is not provided but only an electrical device 525 is electrically connected to a branch harness 517 through two connectors 550 fitted to each other therebetween, the branch harness 517 being branch-connected to a trunk harness 515 having connectors 505 at its opposite ends. In the wire harness having the item number (B), both the electrical device 525 and an additional electric device 511 are provided.

The other is a method using only one wire harness with the item number (B) in which, a part of branch wire harnesses, that is, a branch wire harness 513 can be made to be discarded, as shown in FIG. 18. In this method, the branch wire harness 513 is made to be discarded when the number item (A) is requested.

However, by the method of preparing the two types of item numbers shown in FIG. 17, item numbers of wire harnesses increase like "item number (A)", "item number (B)", . . . "item number (n)" whenever another additional electrical device is added. When the item numbers of the wire harnesses assembled thus are too large, assembling work in a wire harness assembling line is complicated. As a result, efficiency of the wire harness assembling work deteriorates.

On the other hand, in the method using only one wire harness with the item number (B) in which a part of branch wire harnesses, that is, the branch wire harness 513 can be made to be discarded, as shown in FIG. 18, the branch wire harness 513 which has been routed on a vehicle but is not put into use is generated. As a result, waste increases and manufacturing cost increases.

In addition, a method using a wire harness with a full length corresponding to an attachment position of an additional electrical device is considered as further another method of coping with addition of the additional electrical device. In this case, the additional electrical device is attached to the wire harness in a retrofitting manner. However, when the additional electrical device is not attached, a waste portion not put into use is left in the wire harness. As a result, manufacturing cost increases. Further, there is a problem that the additional electrical device cannot be replaced easily or cannot be repaired easily when the additional electrical device breaks down. This is because an insulating coating or a conductor of the wire harness is damaged due to pressure contact when the additional electrical device is electrically connected to the wire harness by the pressure contact.

SUMMARY OF THE INVENTION

The present invention has been accomplished in consideration of the aforementioned circumstances. An object of the present invention is to provide a wire harness structure which can be used to cope with a wide variety of wire harness item numbers and in which discard of a wire harness can be eliminated.

The foregoing object according to the present invention is attained by the following configurations.
(1) A wire harness structure including: a main harness that has a trunk harness routed on a vehicle, and has at least one branch harness having one end connected to the trunk harness as a branch and the other end electrically connected to an electrical device standardly mounted on the vehicle; and a branch connection mechanism to which at least one additional electrical device additionally mounted on the vehicle is electrically connected, and which is connected in a retrofitting manner as a branch to the at least one branch harness connected to the electrical device.

According to the wire harness structure having the aforementioned configuration (1), the electrical device which is, for example, requisite (standard) is connected to the trunk harness through the branch harness. At least one additional electrical device can be connected to the main harness (the trunk harness or the branch harness) constituted by the trunk harness and the branch harness by the branch connection mechanism in a retrofitting manner. The main harness constituted by the trunk harness and the branch harness is assigned to have one single item number. That is, main harnesses to which a plurality of additional electrical devices are retrofitted by the branch connection mechanism are all assigned to have the same item number.

In addition, the trunk harness can be manufactured with a requisite minimum length. That is, it is unnecessary to use a trunk harness having a full length corresponding to attachment positions of the additional electrical devices.
(2) The wire harness structure according to the aforementioned configuration (1), wherein the branch connection mechanism includes a branch connection member that has at least one branch conductor to which the additional electrical device is electrically connected as a branch, and has a pair of connection portions that are provided at opposite end portions of the branch conductor and disposed on an insulating substrate; and one end of a connection conductor the other end of which is connected to one of the connection portions is connected to the at least one branch harness which is connected to the electrical device.

According to the wire harness structure having the aforementioned configuration (2), the one end of the connection conductor is electrically connected to the main harness (the trunk harness or the branch harness), and the other end of the connection conductor is electrically connected to the connection portion of the branch conductor in the branch connection member. Thus, the first branch connection member on an upstream side is electrically connected to the main harness. An additional branch connection member or an additional electrical device can be sequentially connected to the first connected branch connection member. That is, when, of a connection conductor having one end electrically connected to the other connection portion, the other end is only electrically connected to one of connection portions of another branch connection member, the other branch connection member or the additional electrical device can be added easily. In order to repair/replace the other branch connection member or the additional electrical device, the other branch connection member may be entirely replaced with a new one after the other end of the connection conductor is cut off or the connection portion is disconnected. Therefore, the repair/replacement is easy. In addition, after the other branch connection member is replaced with the new one, the other end of the connection conductor can be electrically connected to one of connection portions of the new branch connection member. Accordingly, a damaged portion of an insulating coating or the conductor caused by pressure contact etc. can be prevented from being used.

(3) The wire harness structure according to the aforementioned configuration (1), wherein the branch connection mechanism includes a plurality of branch connection members each of which has an input connector portion, and a pair of output connector portions branched from the input connector portion electrically and conductively thereto; and in one of the branch connection members having one of the output connector portions connected to the electrical device, the input connector portion is connected to the at least one branch harness connected to the electrical device, and the other output connector portion is connector-connected to the input connector portion in another of the branch connection members in which one of the output connector portions is connected to the additional electrical device.

According to the wire harness structure having the aforementioned configuration (3), each of the branch connection members has one input connector portion, and one pair of output connector portions electrically conductive to the input connector portion. The input connector portion in a first one of the branch connection members on an upstream side is electrically connected to the conductor of the main harness. Accordingly, the pair of output connector portions are also in an electrically conductive connection state to the conductor of the main harness. The electrical device mounted on the vehicle is electrically connected to one of the paired output connector portions. To the other of the paired output connector portions, the input connector portion in another of the branch connection members in which one of the output connector portions is electrically connected to the additional electrical device is connected.

Thus, in the wire harness structure having the present configuration, when, in one of the branch connection members having the one output connector portion electrically connected to the electrical device or the additional electrical device, the other output connector portion is only connector-connected to the input connector portion of another of the branch connection members, the other branch connection member and the additional electrical device can be added easily. In addition, the input connector portion may be connected to or disconnected from the output connector portion of the other branch connection member. Thus, the other branch connection member or the additional electrical device can be replaced easily.

(4) A wire harness structure according to the aforementioned configuration (1), wherein the branch connection mechanism includes a branch connection member that has a plurality of branch output connector portions connected to the electrical device and the additional electrical device respectively, and has an input connector portion collectively and electrically conductive to the branch output connector portions; and the at least one branch harness connected to the electrical device is connected to the input connector portion.

According to the wire harness structure having the aforementioned configuration (4), when the input connector portion of the branch connection member is electrically connected to the conductor of the main harness, all the branch output connector portions provided in the branch connection member are in an electrically conductive connection state to the conductor of the main harness. Thus, by suitable selection of one from a plurality of types of branch connection members different in the number of branch output connector portions, a desired number of additional electrical devices can be added easily without waste. In addition, the electrical device and the additional electrical devices may be connected to or disconnected from the branch output connector portions. Thus, the electrical device and the additional electrical devices can be replaced easily.

(5) A wire harness structure according to any one of the aforementioned configurations (1) to (3), wherein the branch connection mechanism has a control function portion configured to control the electrical device or the additional electrical device.

According to the wire harness structure having the aforementioned configuration (5), the control function portion is provided in the branch connection member that serves as a relay between the main harness and the additional electrical device to establish electric connection therebetween. Accordingly, the additional electrical device can be controlled. Thus, it is easy to improve functions of the additional electrical device. When, for example, a microcomputer is built in as the aforementioned control function portion, it is easy for the control function portion to support the control of the additional electrical device or change specifications. In addition, when, for example, a fuse function is built in as the aforementioned control function portion, it is possible to directly connect the control function portion to the main harness or it is possible to simultaneously mount a plurality of additional electrical devices in the control function portion. Further, the relay or the fuse can be disposed decentralizedly so that a relay box can be made compact.

According to the wire harness structure according to the present invention, it is possible to cope with a wide variety of wire harness item numbers, and it is possible to eliminate discard of a wire harness.

The present invention has been described above briefly. When undermentioned modes (hereinafter referred to as "embodiments") for carrying out the invention are further read through with reference to the accompanying drawings, details of the present invention will be made clearer.

DETAILED DESCRIPTION OF THE EXEMPLARY EMBODIMENTS

Embodiments according to the present invention will be described below with reference to the drawings.

Figure 1:
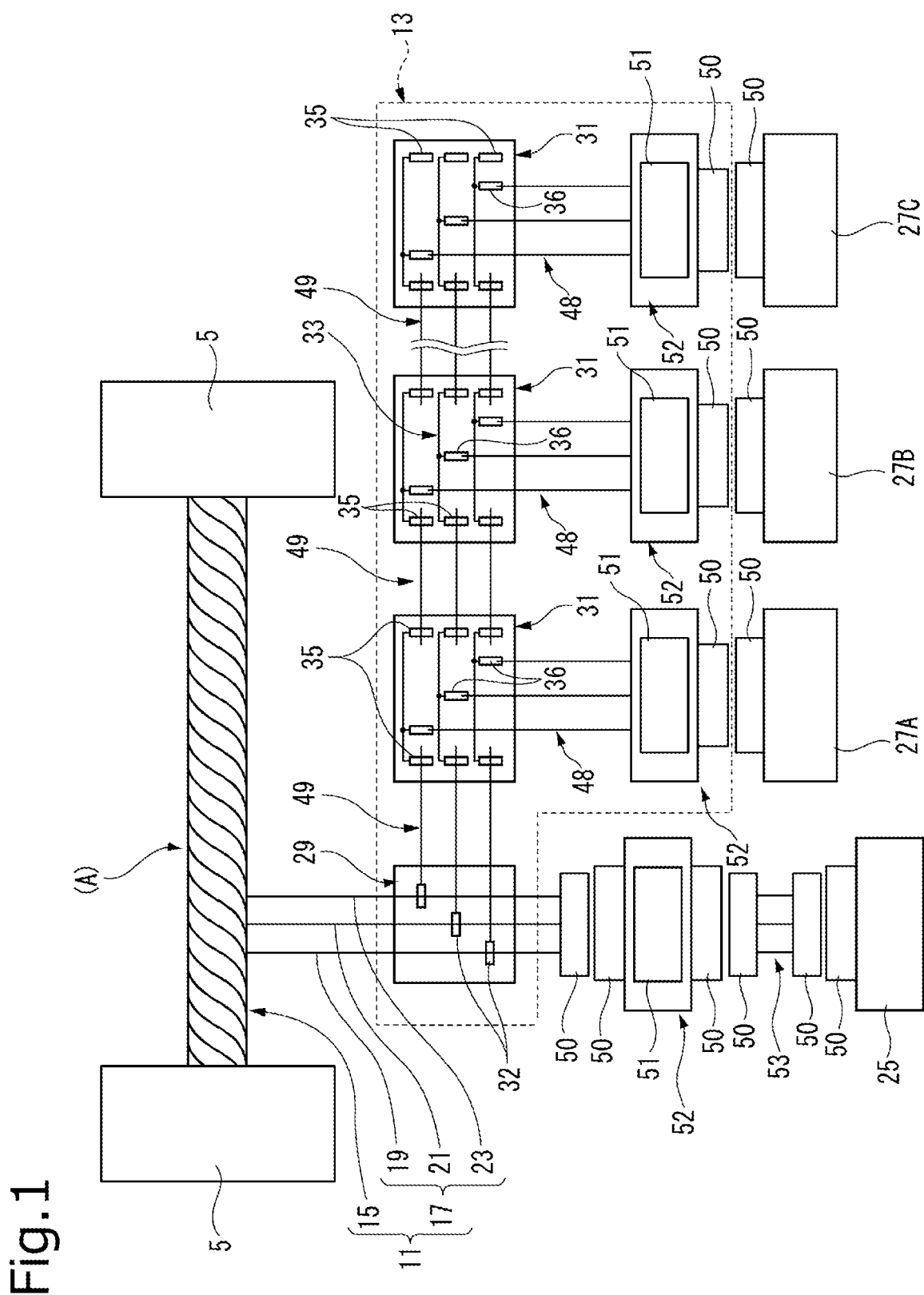
FIG. 1 is a schematic view of a wire harness structure according to a first embodiment of the present invention.

FIG. 1 is a schematic view of a wire harness structure according to a first embodiment of the present invention.

The wire harness structure according to the first embodiment has a main harness 11 and a branch connection mechanism 13 as main constituents. The main harness 11 includes a trunk harness 15 and a branch harness 17.

The trunk harness 15 can be commonly attached to a plurality of vehicles that are targets to be attached. The trunk harness 15 is an electric wire bundle that basically consists of a plurality of electric wires including a power supply wire 19, a communication wire 21 and a ground wire (GND) 23. In the trunk harness 15, an insulating tape is wound around an outer circumference of the electric wire bundle so as to bind the plurality of electric wires together. The trunk harness 15 shown in FIG. 1 has opposite ends to which connectors 5 are electrically connected. The trunk harness 15 is connector-connected to another electric wire bundle electrically connected to a battery or a joint box. That is, the trunk harness 15 is electrically connected to the other electric wire bundle in a wire-to-wire manner.

The branch harness 17 is an electric wire bundle serving as a branch (a line on a downstream side of the trunk) and basically consisting of three kinds of electric wires, i.e. a power supply wire 19, a communication wire 21 and a ground wire 23 (GND). One end of the branch harness 17 is branch-connected to the trunk harness 15. The other end of the branch harness 17 is electrically connected to an electrical device 25 mounted on a vehicle. It will go well as long as at least one of the power supply wire 19, the communication wire 21 and the ground wire 23 (GND) in the branch harness 17 connected to the electrical device 25 is branch-connected to the trunk harness 15 in accordance with the kind of the electrical device 25. In addition, in the main harness 11, a plurality of branch harnesses 17 each having a bundle-like shape including a power supply wire 19, a communication wire 21 and a ground wire 23 (GND) may be connected to the trunk harness 15.

A control connector portion 52 is electrically connected to the other end of the branch harness 17 due to connectors 50 fitted to each other therebetween. The electrical device 25 is electrically connected to the control connector portion 52 through an additional harness 53 due to connectors 50 fitted to each other therebetween. Incidentally, the electrical device 25 may be directly electrically connected to the control connector portion 52 through the additional harness 53.

The control connector portion 52 has a control function portion 51 for controlling the electrical device 25. The control function portion 51 has a configuration in which a "microcomputer", a "mechanical fuse (blowable type fuse)", a "semiconductor fuse", a "relay" and a "communication transceiver" are mounted on a circuit board or on a circuit unit etc. using a busbar. In the control function portion 51 mounted with the microcomputer, a signal from the communication wire 21 is received and a control signal is generated by a signal generating portion. Thus, the control function portion 51 mounted with the microcomputer controls operation of the electrical device 25 or any of additional electrical devices 27A to 27F that will be described later.

In the vehicle in the present embodiment, an ECU (Electronic Control Unit) acts as a master, and the control function portion 51 for the electrical device 25 or the additional electrical device 27A to 27F acts as a slave. In the background art, one ECU centralizedly performs control on a plurality of loads. In this case, a burden is concentrated on the ECU. To solve this problem, in the wire harness structure according to the present embodiment, the control function portion 51 is provided for each of the electrical device 25 and the additional electrical devices 27A to 27F, so that control can be dispersed by the ECU and the control function portion 51. For example, the control function portion 51 provided with the microcomputer has a function of communicating with the ECU and the other control function portions 51. The control function portion 51 can control any other load in accordance with a control signal received from the ECU through the communication. In addition, the control function portion 51 can also transmit a signal expressing a state of a switch or a sensor to the ECU though the communication. It is a matter of course that the wire harness structure according to the present invention is not limited to master-slave control but the ECU may centralizedly control the electrical device 25 and the additional electrical devices 27A to 27F.

One or more additional electrical devices 27A to 27C mounted on the vehicle are electrically connected to the branch connection mechanism 13. In the embodiment, a plurality of additional electrical devices 27A to 27C such as loads or switches are connected.

The branch connection mechanism 13 is provided with a connection member 29, a plurality of branch connection members 31, and control connector portions 52. One of the branch connection members 31 is branch-connected to the branch harness 17 in the main harness 11 through the connection member 29 in a retrofitting manner. That is, in the branch connection member 31, one end of each connection conductor 49 is electrically connected to a pressure contact portion 35 which serves as one of connection portions of a branch conductor 33. The other end of the connection conductor 49 whose one end is electrically connected to the branch conductor 33 is connected by pressure contact with a conductor (the power supply wire 19, the communication wire 21 or the ground wire 23) of the branch harness 17 in the main harness 11 by the connection member 29.

Figure 2:
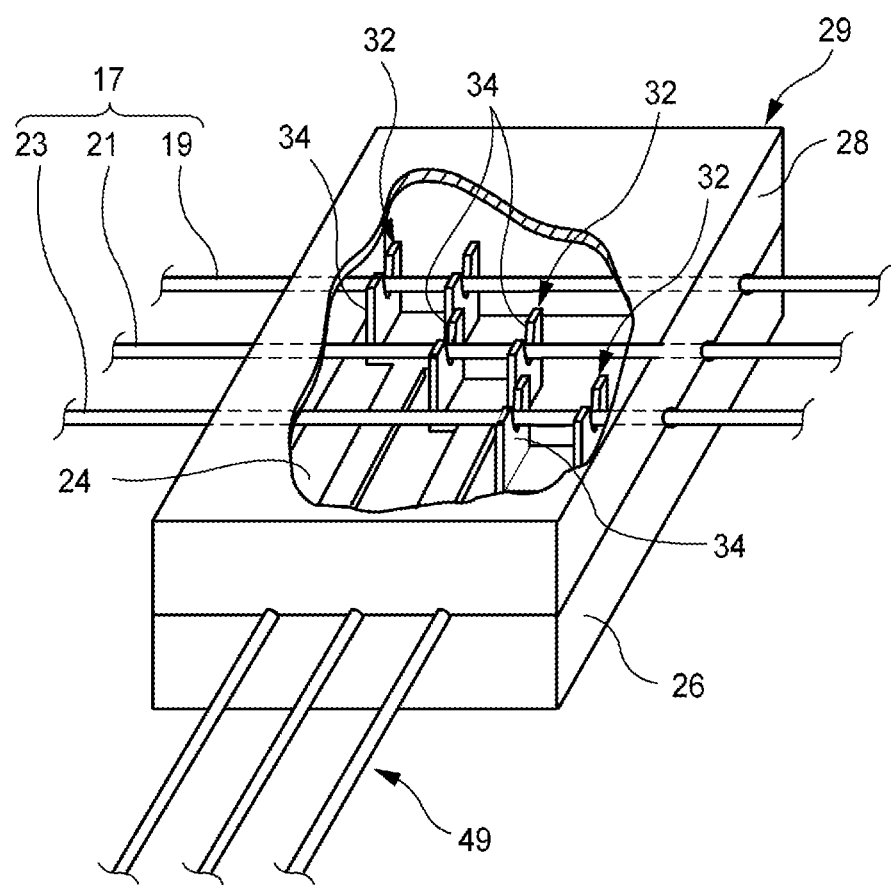
FIG. 2 is a partially broken perspective view of a connection member shown in FIG. 1.

As shown in FIG. 2, the connection member 29 has connection portions 32. Each connection portion 32 is electrically connected to one end of a corresponding connection conductor 49 the other end of which is electrically connected to the branch connection member 31 of the branch connection mechanism 13. The connection portion 32 is electrically connected to the power supply wire 19, the communication wire 21, or the ground wire 23 in the branch harness 17. The connection portion 32 is constituted by a plurality, for example, a pair of erect pressure contact blades 34. The connection portion 32 is electrically connected to the one end of the connection conductor 49 through a predetermined circuit in a circuit board 24 etc. Incidentally, the connection portion 32 is not limited to connection by pressure contact using the pressure contact blades 34 but can use various connection forms such as crimp connection. The circuit board 24 is received inside a casing that is made of an insulating resin and that is constituted by an upper casing part 28 and a lower casing part 26. The upper casing part 28 and the lower casing part 26 are coupled to each other openably/closably, for example, by thin hinges (not shown).

In the connection member 29, when the power supply wire 19, the communication wire 21, and the ground wire 23 in the branch harness 17 are put between the upper casing part 28 and the lower casing part 26, insulating coatings of the respective wires are cut by the pressure contact blades 34, and the connection portions 32 are connected by pressure contact with the conductors of the respective wires. The connection member 29 holding the power supply wire 19, the communication wire 21 and the ground wire 23 of the branch harness 17 can be fixed to any position of the branch harness 17 by the upper casing part 28 and the lower casing part 26 locked to each other. That is, when the branch connection mechanism 13 is only attached to any position of the branch harness 17 through the connection member 29, electric connection of the main harness 11 with the electrical device 25 and the additional electrical devices 27A to 27C can be completed simply.

Figure 3:
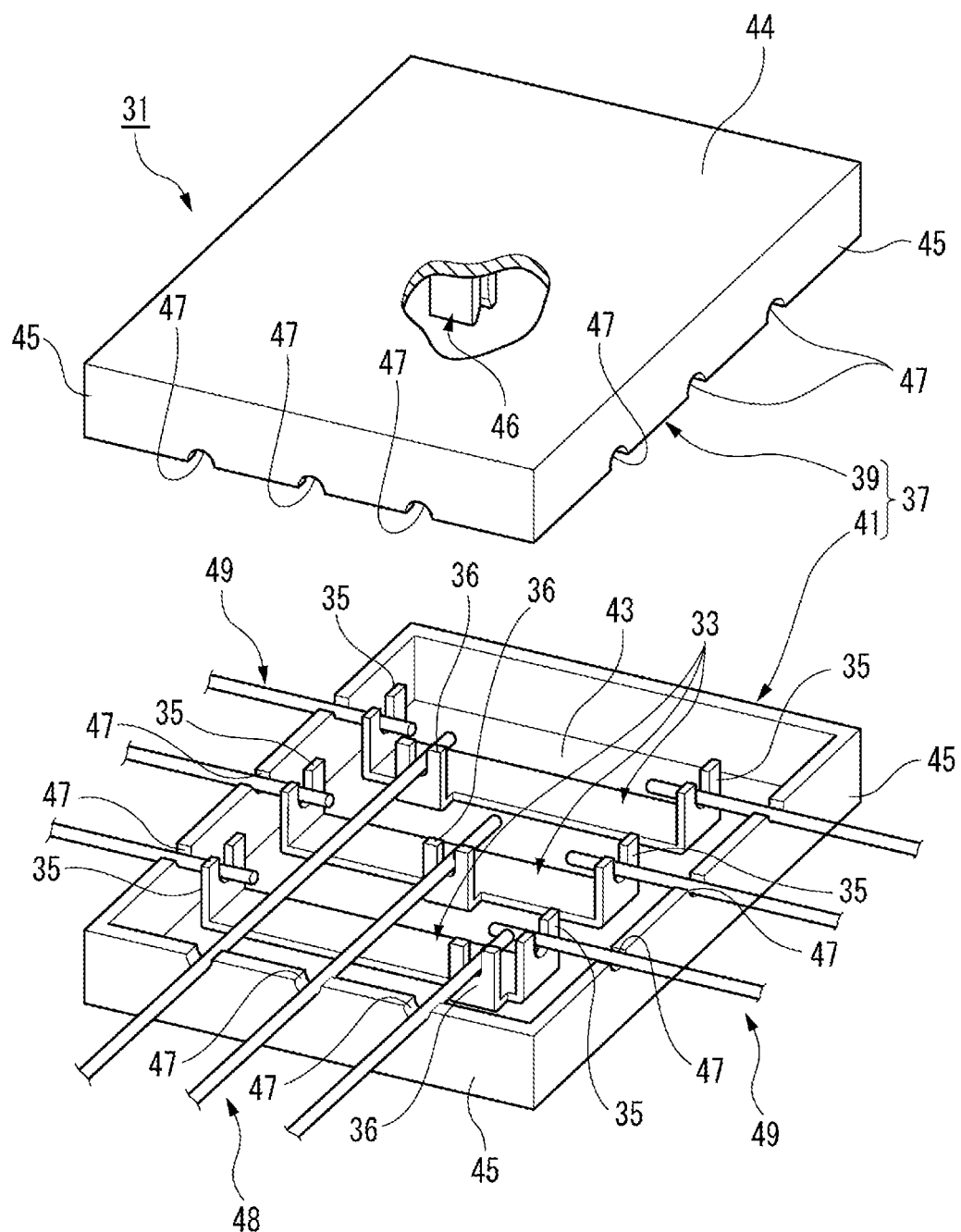
FIG. 3 is an exploded perspective view of a branch connection member shown in FIG. 1.

As shown in FIG. 3, each branch connection member 31 according to the present embodiment has three branch conductors 33, and pressure contact portions 35. One ends of connection conductors 48 electrically connected to the additional electrical devices 27A to 27C are branch-connected to the three branch conductors 33 respectively. The pressure contact portions 35 are provided at opposite end portions of each of the branch conductors 33.

Each branch conductor 33 includes at least one conductor (such as a busbar or an electric wire). One end of one of the connection conductors 48 electrically connected to one of the additional electrical devices 27A to 27C is electrically branch-connected to the branch conductor 33 through a connection portion 36 provided in an intermediate portion of the branch conductor 33. At the same time, end portions of upstream-side and downstream-side connection conductors 49 are electrically connected to the branch conductor 33 through a pair of the pressure contact portions 35 provided at the opposite end portions of the branch conductor 33. The branch conductor 33 is disposed on an insulating substrate. In the present embodiment, the pressure contact portions 35 serving as a pair of connection portions are bent and formed at the opposite end portions of the branch conductor 33 made up of the busbar, and a pressure contact portion serving as the connection portion 36 is bent and formed at the intermediate portion of the branch conductor 33. Incidentally, the connection portion 36 is not limited to connection by pressure contact using the pressure contact portion but may use various connection forms. It is a matter of course that the connection portions of the present invention provided at the opposite end portions of the branch conductor 33 are also not limited to connection by pressure contact using the pressure contact portions 35 but may use various connection forms such as crimp connection.

In addition, the branch connection member 31 has a casing 37 made of an insulating material such as a synthetic resin. The casing 37 consists of an upper casing part 39 and a lower casing part 41. When, for example, lock claws of the upper casing part 39 are locked to or unlocked from lock portions of the lower casing part 41, the upper casing part 39 and the lower casing part 41 are attached to each other closably/openably. A configuration can be made so that the plurality of branch conductors 33 are arranged on a bottom plate 43 of the lower casing part 41. In this case, the bottom plate 43 of the lower casing part 41 serves as an insulating substrate. Accordingly, a circuit board can be dispensed with. A plurality of conductor through holes 47 are formed at positions corresponding to the pressure contact portions 35 and the connection portions 36 in side walls 45 of the upper casing part 39 and the lower casing part 41. In the branch connection member 31, the connection conductors 48 and 49 connected to the pressure contact portions 35 and the connection portions 36 respectively are led to the outside of the casing 37 from the conductor through holes 47. A plurality of pairs of pressure contact ribs 46 which can be respectively urged to press, in a pressure contact direction, the connection conductors 48 and 49 brought into pressure contact with the pressure contact portions 35 and the connection portions 36 are provided protrusively on an inner surface of a top plate 44 in the upper casing part 39.

In addition, the branch connection mechanism 13 according to the first embodiment is provided with the control connector portion 52 having the control function portion 51 for controlling each additional electrical device 27A to 27C. That is, to the other ends of the connection conductors 48 the one ends of which are connected to the branch connection member 31, the control connector portion 52 is connected due to connectors 50 fitted to each other therebetween. The additional electrical device 27A to 27C is electrically connected to the control connector portion 52 through an additional harness 53 due to connectors 50 fitted to each other therebetween. Incidentally, the additional electrical device 27A to 27C may be directly electrically connected to the control connector portion 52 through the additional harness 53.

In a background-art wire harness structure, an item number is assigned to a wire harness in accordance with presence/absence of each additional electrical device 27A to 27C. In this case, a wire harness in which an electrical device 25 is provided in a trunk harness 15 is assigned an item number (A).

The wire harness added with the additional electrical device 27A is assigned an item number (B). The wireless harness further added with the additional electrical device 27B is assigned an item number (C). Here, the wire harness that is not provided with the additional electrical device 27A but provided with the electrical device 25 and the additional electrical device 27B is assigned an item number (D).

On the other hand, in the wire harness structure according to the first embodiment, only the main harness 11 of the item number (A) serving as a base is produced. Accordingly, the additional electrical devices 27A to 27B are retrofitted to the main harness 11 suitably by the branch connection mechanism 13. Thus, the wire harness structure according to the first embodiment can cope with a wide variety of wire harness item numbers.

That is, for example, a wire harness to which an additional electrical device 27A is added through a connection member 29 branch-connected to a branch harness 17 and a branch connection member 31 corresponds to the item number (B). The wire harness to which an additional electrical device 27B is further added through another branch connection member 31 corresponds to the item number (C). The wire harness to which only the additional electrical device 27B is added through the connection member 29 branch-connected to the branch harness 17 and the other branch connection member 31 corresponds to the item number (D). Consequently, according to the wire harness structure according to the first embodiment, it is unnecessary to add a new item number whenever any of the additional electrical devices 27A to 27C to the branch harness 17 of the main harness 11 is increased/decreased.

Figure 4:
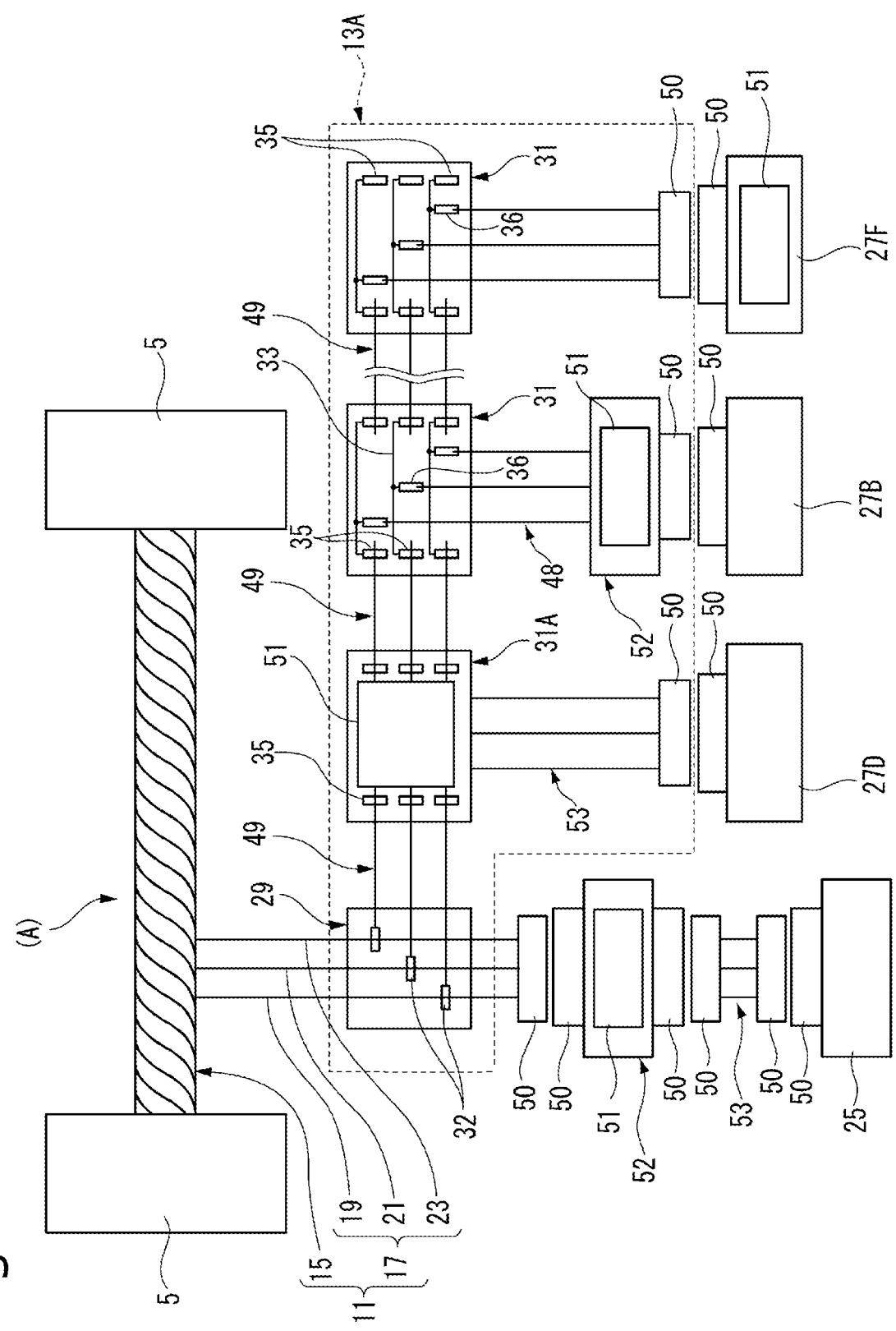
FIG. 4 is a schematic view of a wire harness structure of Modification 1 according to the first embodiment of the present invention.

In a wire harness structure of Modification 1 according to the first embodiment of the present invention shown in FIG. 4, a branch connection member 31A in a branch connection mechanism 13A has a control function portion 51 for controlling an additional electrical device 27D.

Figure 5:
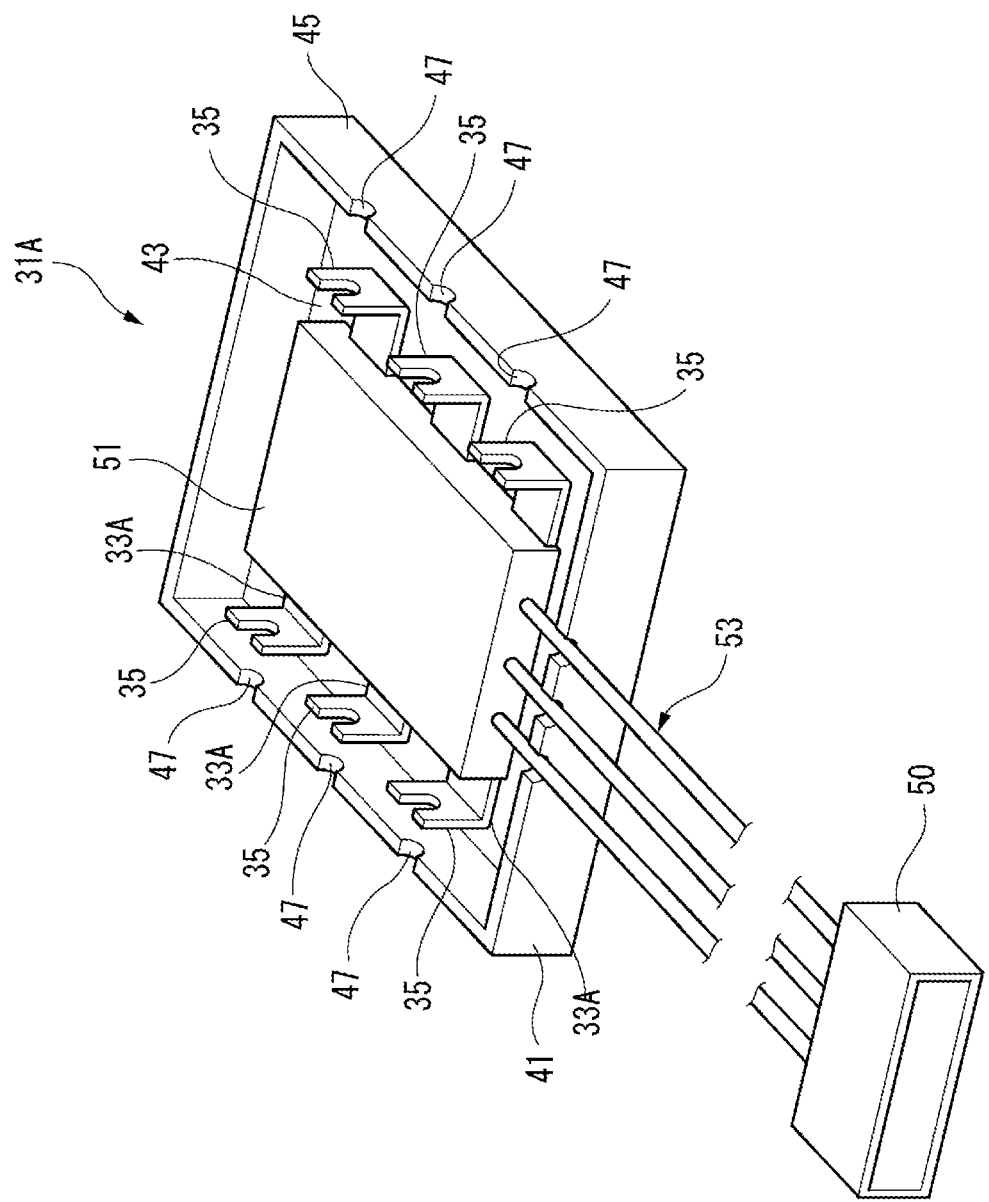
FIG. 5 is a perspective view of an exploded state of a branch connection member in which a control function portion is provided.

As shown in FIG. 5, the branch connection member 31A is provided with the control function portion 51 inside a casing. The control function portion 51 is provided on a bottom plate 43 serving as an insulating substrate of a lower casing part 41. The control function portion 51 is provided to be electrically conductive to a plurality of branch conductors 33A having pressure contract portions 35 provided at their opposite ends, and an additional harness 53 that is connected to the additional electrical device 27D due to connectors 50 fitted to each other therebetween is led out of the control function portion 51.

Figure 6:
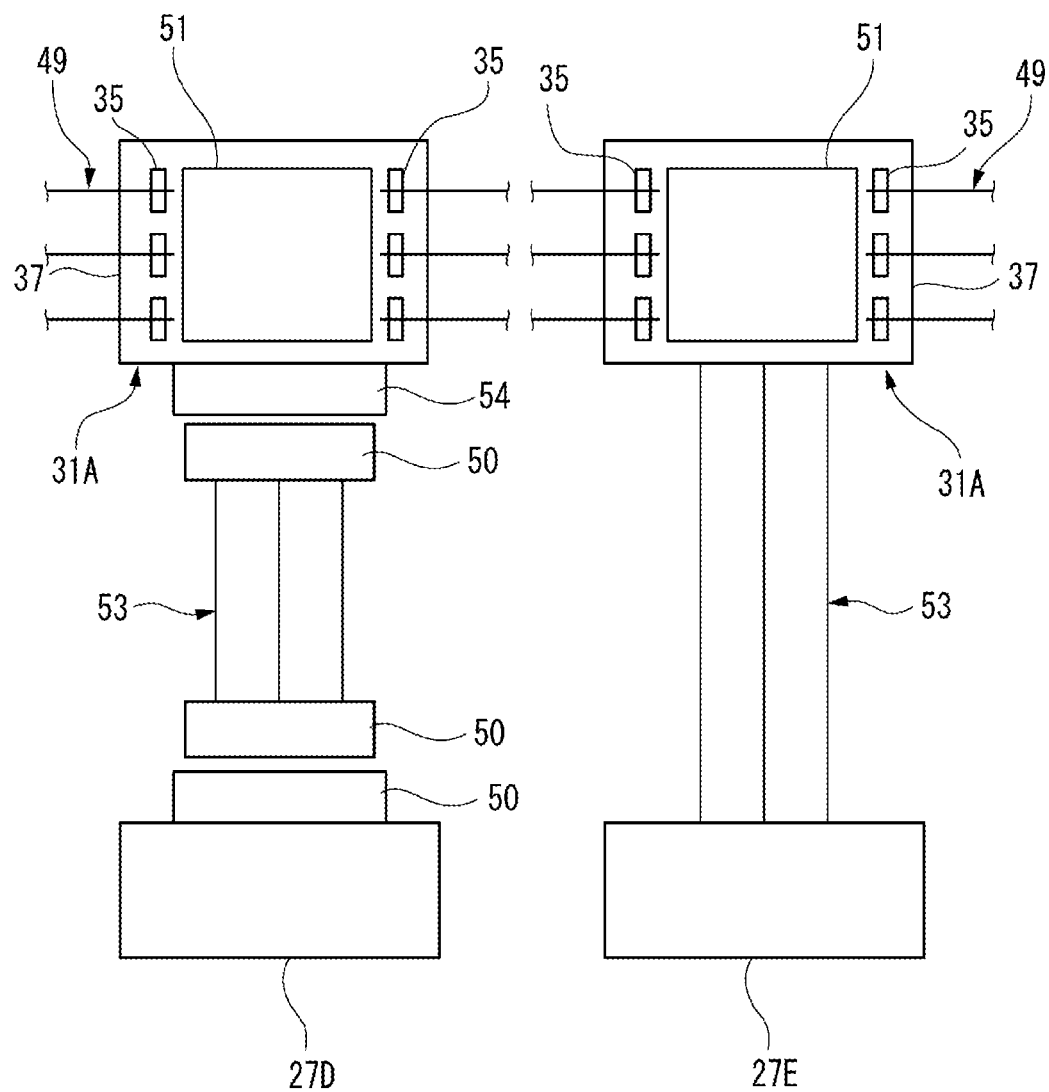
FIGS. 6A and 6B are schematic views respectively representing other connection examples between the control function portion and an additional electrical device.

Incidentally, as shown in FIG. 6A, a branch connection member 31A provided with a control function portion 51 may be connector-connected to an additional harness 53. In this case, a connector 54 electrically conductive to the control function portion 51 is provided in a casing 37 of the branch connection member 31A. The connector 54 is connector-connected to a connector 50 of an additional electrical device 27D by the additional harness 53. Connectors 50 are provided at opposite ends of the additional harness 53.

In addition, as shown in FIG. 6B, a branch connection member 31A provided with a control function portion 51 may be directly electrically connected to an additional electrical device 27E by only an additional harness 53 without use of any connectors 50 and 54.

In addition thereto, control function portions 51 may be provided in a control connector portion 52 and an additional electrical device 27F respectively, as shown in FIG. 4.

Figure 7:
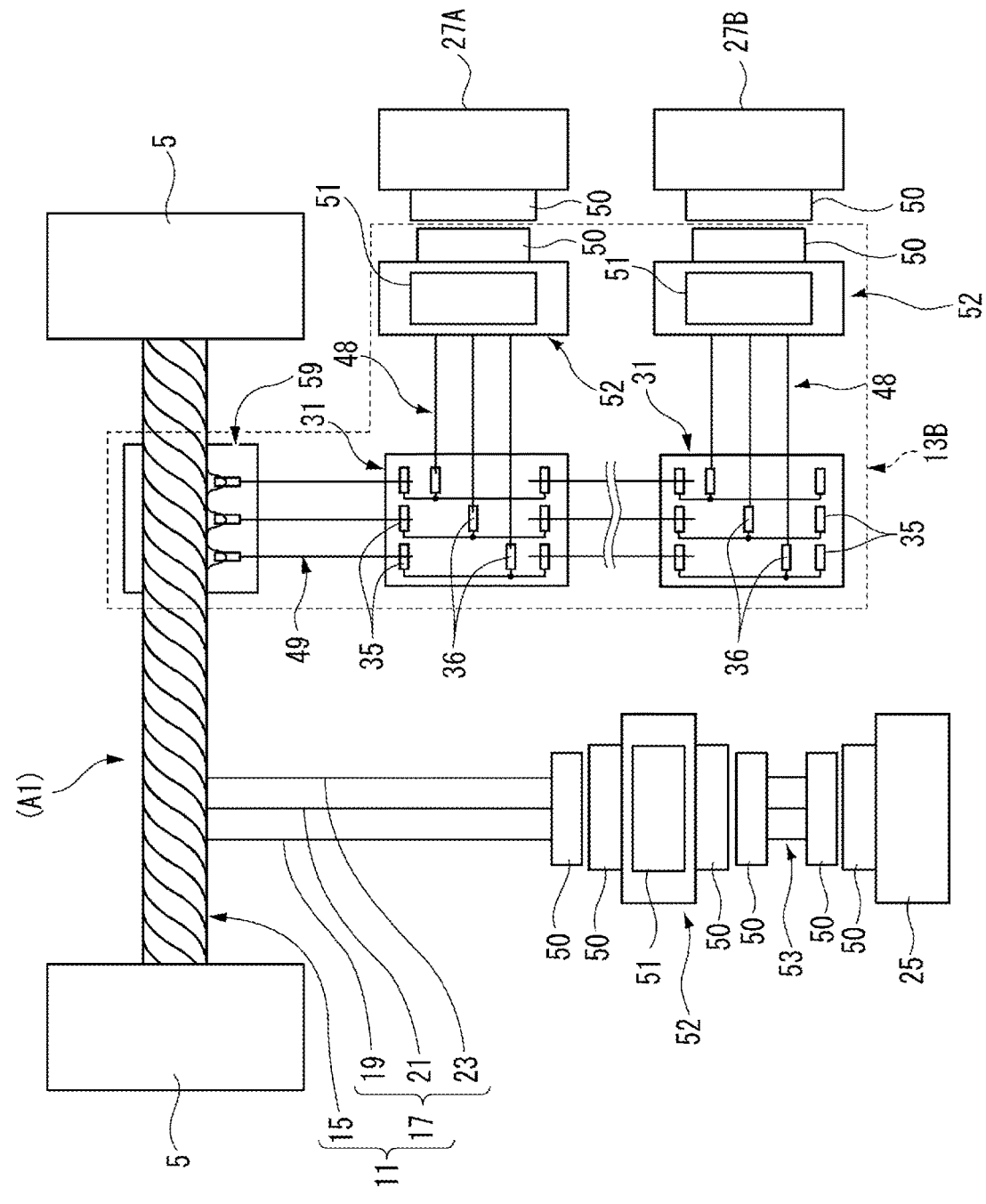
FIG. 7 is a schematic view of a wire harness structure of Modification 2 according to the first embodiment of the present invention.

FIG. 7 is a schematic view of a wire harness structure of Modification 2 according to the first embodiment of the present invention in which a branch connection member is connected to a trunk harness.

The case where the branch connection member 31, 31A is branch-connected to the branch harness 17 of the main harness 11 has been described in each of the aforementioned examples. However, the branch connection member 31 in a branch connection mechanism 13B shown in FIG. 7 is branch-connected to a branch connection portion 59 provided in the trunk harness 15 of a main harness 11. In this case, one end of each connection conductor 49 is brought into pressure contact with a conductor in the branch connection portion 59 of the trunk harness 15, and the other end of the connection conductor 49 is brought into pressure contact with a pressure contact portion 35 of the branch connection member 31.

The branch connection portion 59 is provided so that extra length portions of a power supply wire 19, a communication wire 21 and a ground wire 23 stick out from adjacent pieces of an insulating tape wound around an electric wire bundle of the trunk harness 15. In addition, pressure contact portions of the connection conductors 49 connected by pressure contact with the conductors of the trunk harness 15 are received inside a casing made of an insulating resin.

Incidentally, when the branch connection member 31 of the branch connection mechanism 13B is electrically connected to the branch connection portion 59 of the trunk harness 15 as in the wire harness structure in the Modification 2, the main harness 11 serving as a base is assigned an item number (A1).

Figure 8:
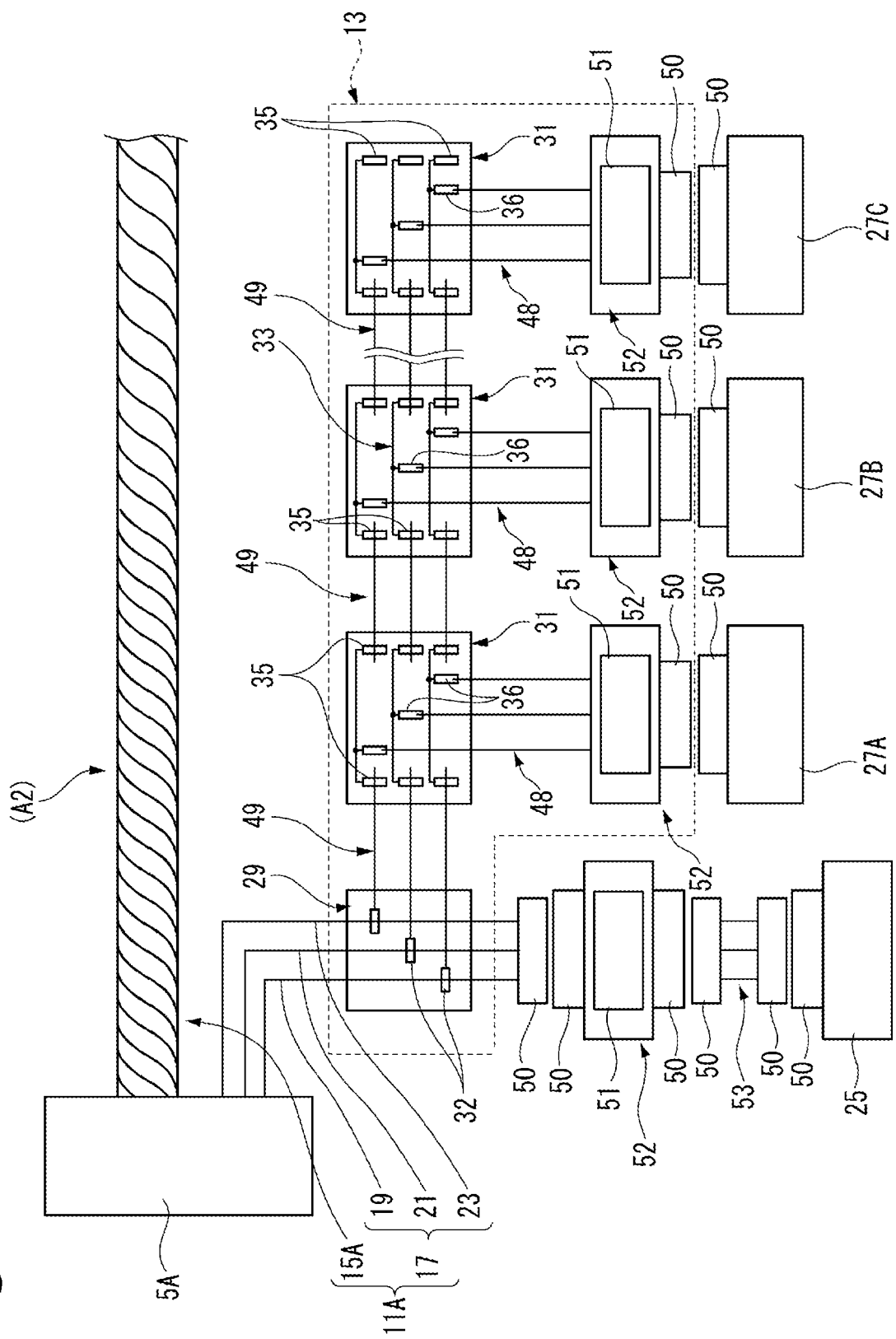
FIG. 8 is a schematic view of a wire harness structure of Modification 3 according to the first embodiment of the present invention.

FIG. 8 is a schematic view of a wire harness structure of Modification 3 according to the first embodiment of the present invention in which one end of a trunk harness and one end of a branch harness in a main harness are electrically connected to a connector respectively.

The connector 5A is provided at the end portions of the trunk harness 15A and the branch harness 17 of the main harness 11A shown in FIG. 8. The connector 5A is electrically connected, for example, to a junction box, a standard electrical device or a termination device etc. In this case, a branch connection member 31 in a branch connection mechanism 13 is branch-connected to the branch harness 17 of the main harness 11A through a connection member 29.

Incidentally, when the connector 5A provided at the one end of the trunk harness 15A and the one end of the branch harness 17 is electrically connected to the junction box, the standard electrical device or the termination device etc. as in the wire harness structure in the Modification 3, the main harness 11A serving as a base is assigned an item number (A2).

Next, functions of the aforementioned wire harness structure according to the first embodiment will be described.

In the wire harness structure according to the first embodiment, the electrical device 25 which is, for example, requisite (standard) is electrically connected to the trunk harness 15 through the branch harness 17. To the main harness 11 constituted by the trunk harness 15 and the branch harness 17, at least one additional electrical device 27A can be branch-connected in a retrofitting manner through the branch connection mechanism 13 (13A). Accordingly, the main harness 11 constituted by the trunk harness 15 and the branch harness 17 is assigned one single item number (A). That is, item numbers of main harnesses 11 to which a plurality of additional electrical devices 27A to 27C are retrofitted through the branch connection mechanism 13 are all the same item number (A).

In the wire harness structure according to the first embodiment, the trunk harness 15 can be manufactured with a requisite minimum length. That is, it is unnecessary to use a wire harness with a full length corresponding to attachment positions of additional electrical devices 27A to 27F. Thus, discard of an extra length wire harness in the wire harness structure according to the first embodiment can be avoided.

In addition, in the wire harness structure according to the first embodiment, one end of each connection conductor 49 is electrically connected to the main harness 11, 11A (the trunk harness 15 (15A) or the branch harness 17), and the other end of the connection conductor 49 is electrically connected to one of pressure contact portions 35 of a corresponding branch conductor 33 (33A) in the branch connection member 31 (31A). Thus, the first branch connection member 31 (31A) on an upstream side is electrically connected to the main harness 11, 11A. Additional branch connection members 31 (31A) or additional electrical devices 27A to 27F can be sequentially connected to the first electrically connected branch connection member 31 (31A). That is, when the other end of each connection conductor 49 one end of which is electrically connected to the other pressure contact portion 35 is only electrically connected to one of pressure contact portions 35 of another branch connection member 31 (31A), the other branch connection member 31 (31A) or the additional electrical device 27A to 27F can be added easily.

In addition, to repair/replace the other branch connection members 31 (31A) or the additional electrical devices 27A to 27F, the other branch connection member 31 (31A) may be entirely replaced with a new one after the other end of the connection conductor 49 is cut off or released from the pressure contact. Therefore, the other branch connection members 31 (31A) or the additional electrical devices 27A to 27F can be repaired/replaced easily. In addition, after the other branch connection member 31 (31A) is entirely replaced with the new one, the other end of the connection conductor 49 can be electrically connected to one of pressure contact portions 35 of the new branch connection member 31 (31A). Accordingly, a damaged portion in the insulating coating or the conductor can be prevented from being used.

Further, in the wire harness structure of the Modification 1 according to the first embodiment shown in FIG. 4, the control function portion 51 is provided in the branch connection member 31A that serves as a relay between the main harness 11 and the additional electrical device 27D to establish electric connection therebetween. Accordingly, the additional electrical device 27D can be controlled. Thus, it is easy to improve functions of the additional electrical device 27D. When, for example, a microcomputer is built in as the control function portion 51, it is easy for the control function portion 51 to support the control of the additional electrical device 27D or change specifications. In addition, when, for example, a fuse function is built in as the control function portion 51, it is possible to directly connect the control function portion 51 to the main harness 11 or it is possible to simultaneously mount a plurality of additional electrical devices 27D in the control function portion 51. Further, the relay or the fuse can be disposed decentralizedly so that a relay box can be made compact.

Next, a second embodiment of a wire harness structure according to the present invention will be described.

Figure 9:
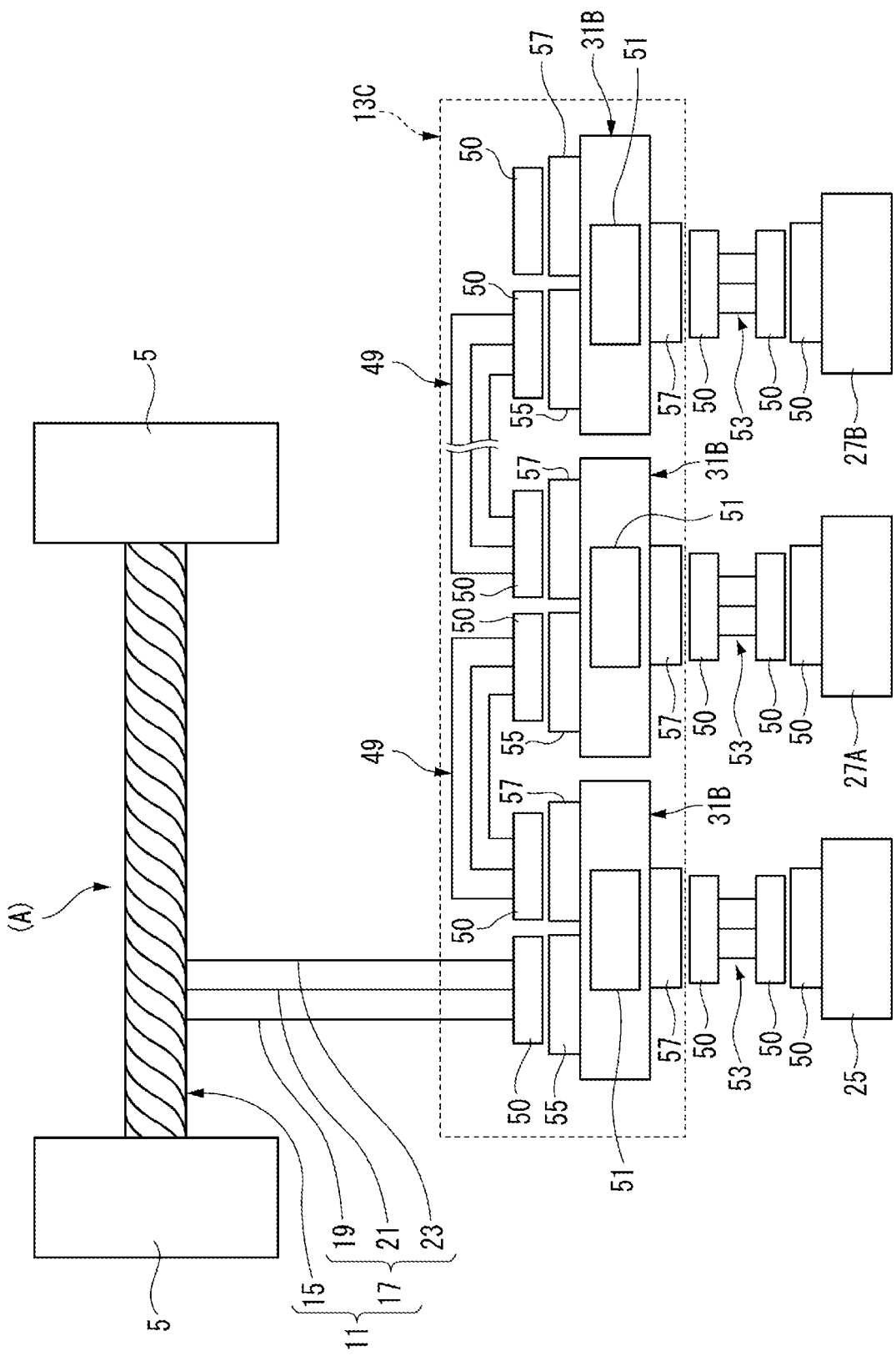
FIG. 9 is a schematic view of a wire harness structure according to a second embodiment of the present invention.

FIG. 9 is a schematic view of the wire harness structure according to the second embodiment of the present invention. Incidentally, in the following embodiments, members the same as the members shown in FIGS. 1 to 7 will be referred to by the same signs correspondingly and respectively, and duplicate description thereof will be omitted.

In the wire harness structure according to the second embodiment, a branch connection mechanism 13C is provided with a plurality of branch connection members 31B, as shown in FIG. 9. Each of the branch connection members 31B is provided with an input connector portion 55, and a pair of output connector portions 57 that are branched from the input connector portion 55 electrically conductively thereto.

One of the output connector portions 57 in one branch connection member 31B on an upstream side (left side in FIG. 9) is connector-connected to an electrical device 25. The input connector portion 55 in the branch connection member 31B electrically connected to the electrical device 25 is connector-connected to a connector 50 of a branch harness 17 in a main harness 11. The other output connector portion 57 in the branch connection member 31B is connector-connected to an input connector portion 55 of another branch connection member 31B on a downstream side (at the center in FIG. 9). One of output connector portions 57 in the other branch connection member 31B is electrically connected to an additional electrical device 27A. The other output connector portion 57 in the other branch connection member 31B is electrically connected to further another branch connection member 31B on a further downstream side (right side in FIG. 9).

Figure 10:
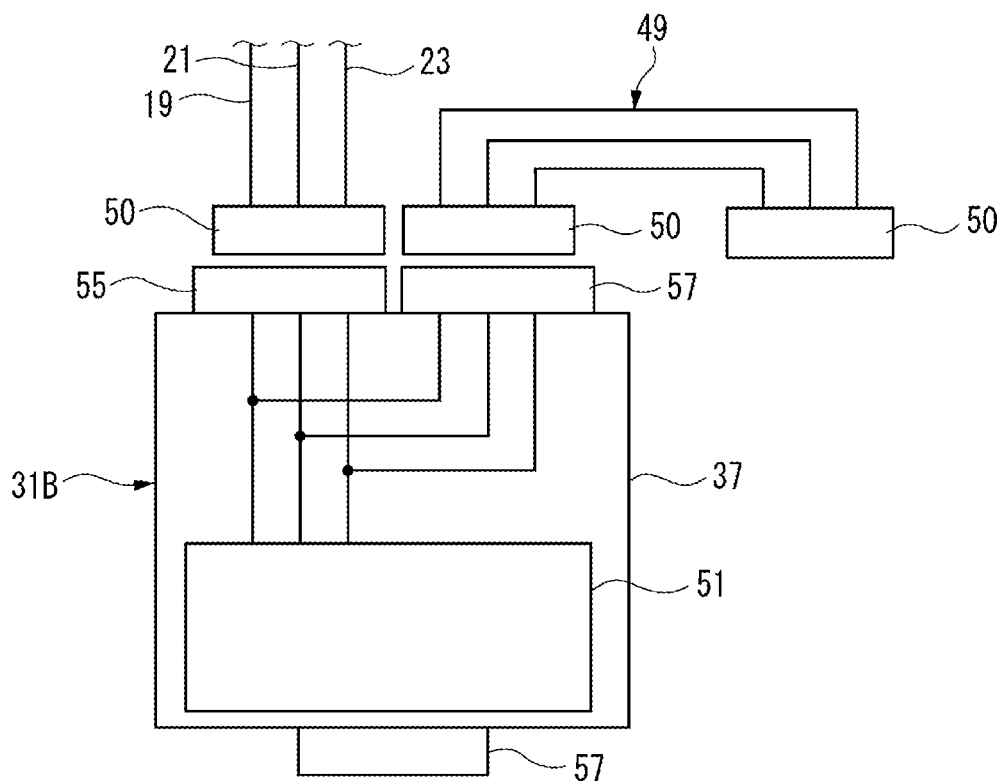
FIG. 10 is a schematic view representing electric connection inside a branch connection member shown in FIG. 9.

FIG. 10 is a schematic view representing electric connection inside each of the branch connection members 31B shown in FIG. 9.

A control function portion 51 is provided in the branch connection member 31B. The input connector portion 55 is electrically connected to the control function portion 51 by printed wiring etc. on a circuit board inside a casing 37 of the branch connection member 31B. The control function portion 51 is electrically connected to one of output connector portions 57 provided in the casing 37. The one output connector portion 57 is connector-connected to an electrical device 25 or an additional electrical device 27A, 27B. In addition, the circuit that electrically connects the input connector portion 55 and the control function portion 51 to each other is branch-connected to the other output connector portion 57. The other output connector portion 57 is connector-connected to an input connector portion 55 of another branch connection member 31B on a downstream side. The other output connector portion 57 and the input connector portion 55 of the other branch connection member 31B on the downstream side are connector-connected to each other through connection conductors 49 having opposite ends to which connectors 50 are attached.

Incidentally, a fuse function of a "mechanical fuse" such as a blade-type fuse, a mini fuse, a low-profile mini fuse or a tube fuse, a "semiconductor fuse", etc. may be built in the control function portion 51 provided in each branch connection member 31B.

Figure 11:
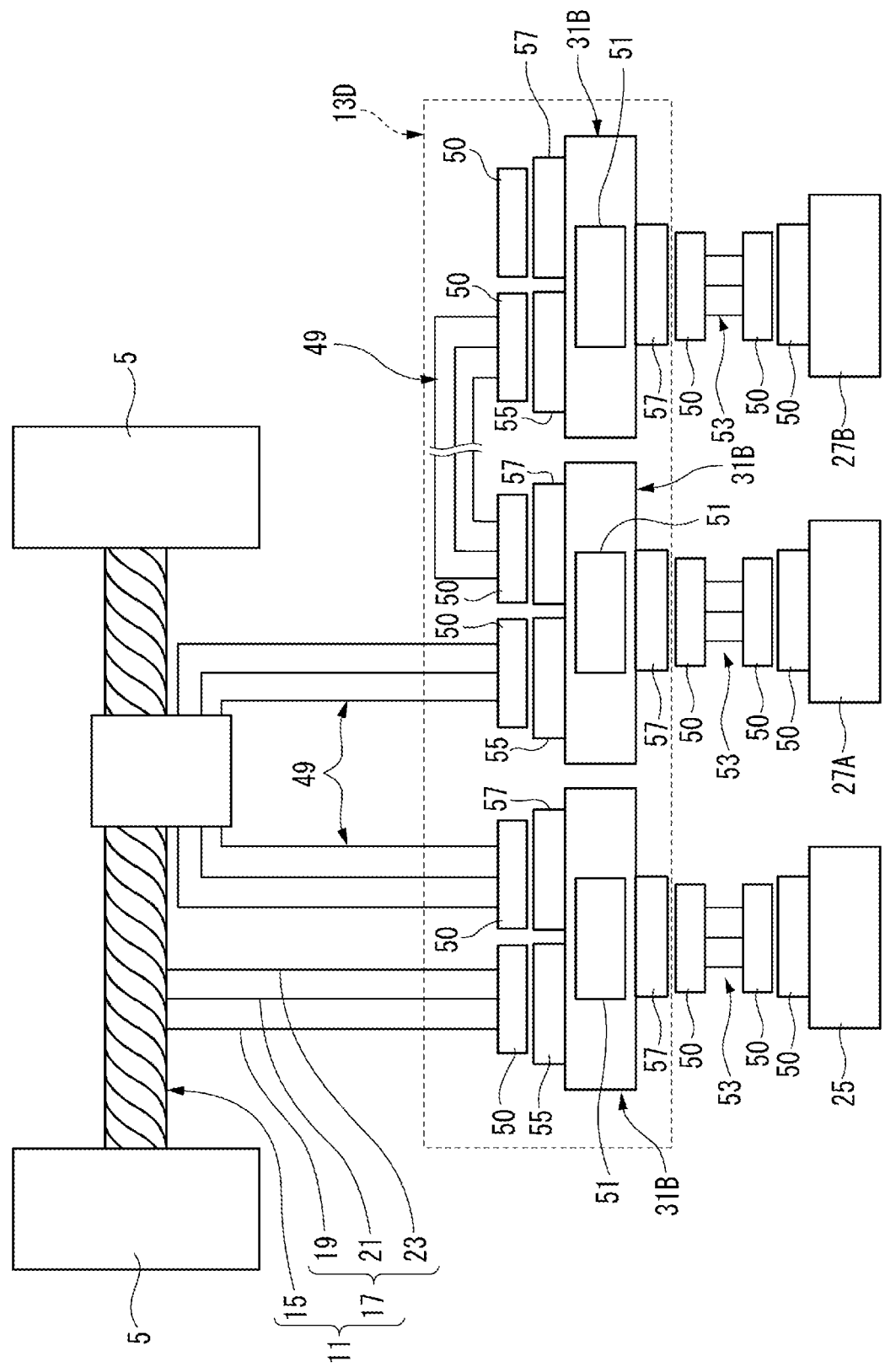
FIG. 11 is a schematic view of a wire harness structure of Modification 4 according to the second embodiment of the present invention.

In addition, in a branch connection mechanism 13D in a wire harness structure of Modification 4 according to the second embodiment of the present invention, as shown in FIG. 11, an output connector portion 57 of a branch connection member 31B on an upstream side and an input connector portion 55 of a branch connection member 31B on a downstream side are electrically connected to each other via connection conductors 49 provided together in a trunk harness 15.

In this case, the connection conductors 49 having opposite ends to which connectors 50 are attached are provided together in advance by tape winding etc. at a predetermined place of the trunk harness 15. Therefore, workability for adding the branch connection member 31B on the downstream side is improved.

Figure 12:
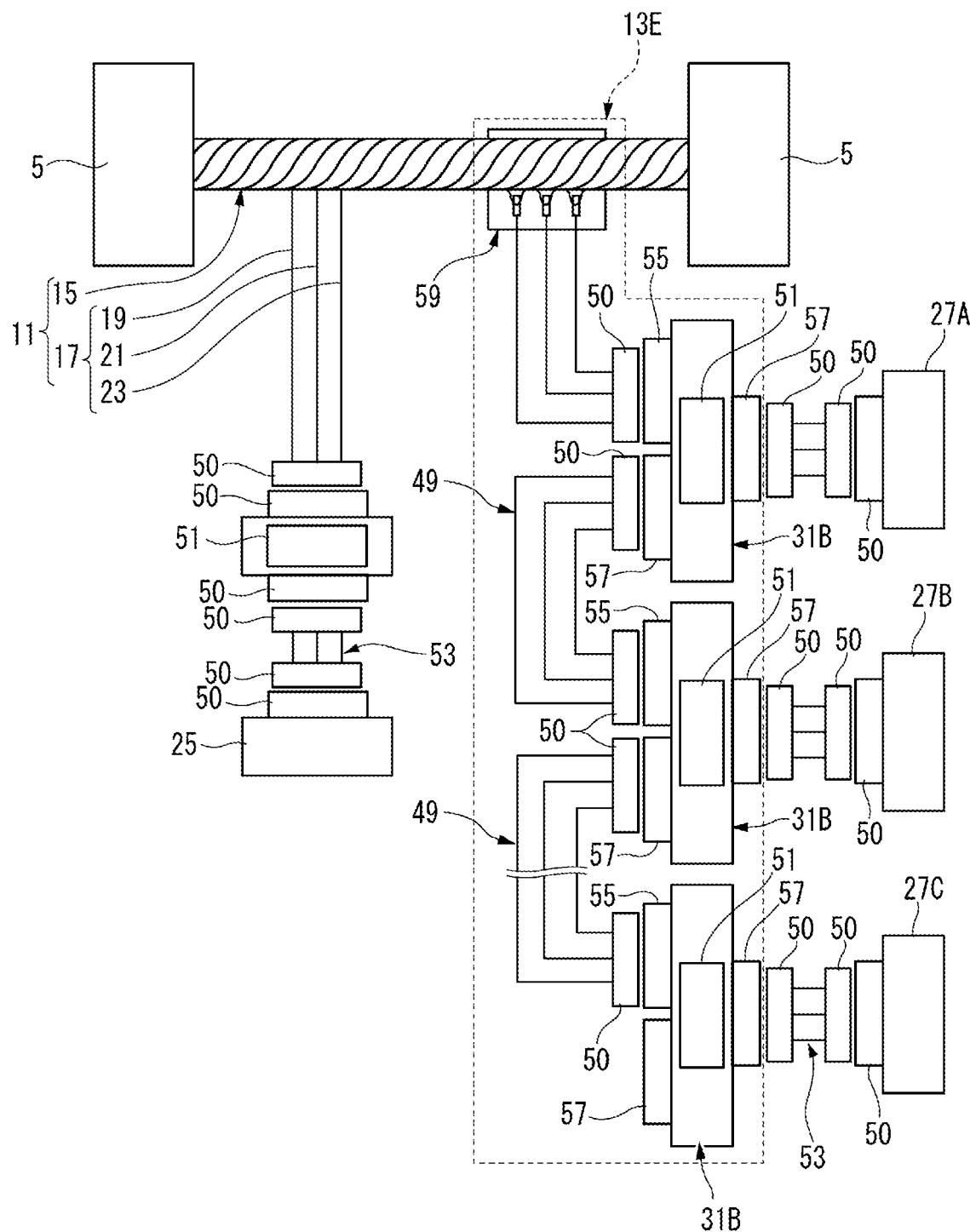
FIG. 12 is a schematic view of a wire harness structure of Modification 5 according to the second embodiment of the present invention.

As in a wire harness structure of Modification 5 according to the second embodiment of the present invention, as shown in FIG. 12, an input connector portion 55 of a first branch connection member 31B on an upstream side in a branch connection mechanism 13E may be electrically connected through a branch connection portion 59 provided at conductors of a trunk harness 15. In this case, the branch connection mechanism 13E is directly electrically connected to the trunk harness 15 without interposition of a branch harness 17 therebetween. The trunk harness 15 and the first branch connection member 31B are connected by pressure contact with each other through connection conductors 49. One ends of the connection conductors 49 are branch-connected to the aforementioned same branch connection portion 59 provided in the trunk harness 15, and a connector 50 at the other ends of the connection conductors 49 is connector-connected to the input connector portion 55. In a similar manner to or the same manner as the branch connection mechanism 13C of FIG. 9, an input connector portion 55 of each of second and following branch connection members 31B on a downstream side and an output connector portion 57 of the branch connection member 31B on the upstream side are connector-connected to each other by connection conductors 49 having opposite ends to which connectors 50 are attached.

In the aforementioned wire harness structure according to the second embodiment, each of the branch connection members 31B has one input connector portion 55, and one pair of output connector portions 57 electrically conductive to the input connector portion 55. In the first branch connection member 31B on the upstream side, the input connector portion 55 is electrically connected to the conductors of a main harness 11 (the trunk harness 15 or the branch harness 17). Accordingly, the pair of output connector portions 57 are also in an electrically conductive connection state to the conductors of the main harness 11. The electrical device 25 standardly mounted on a vehicle is electrically connected to one of the paired output connector portions 57. To the other of the paired output connector portions 57, an input connector portion 55 in another branch connection member 31B in which one of output connector portions 57 is electrically connected to one of additional electrical devices 27A to 27C is electrically connected.

Thus, in the wire harness structure according to the second embodiment, one of the output connector portions 57 in one branch connection member 31B in which the other output connector portion 57 is electrically connected to the electrical device 25 or the additional electrical device 27A to 27C is only connector-connected to an input connector portion 55 of another branch connection member 31B. In this manner, the other branch connection member 31B and the additional electrical device 27A to 27C can be added easily. In addition, the input connector portion 55 may be connected to or disconnected from the output connector portion 57 in the other branch connection member 31B. Accordingly, the other branch connection member 31B or the additional electrical device 27A to 27C can be repaired/replaced easily.

Figure 13:
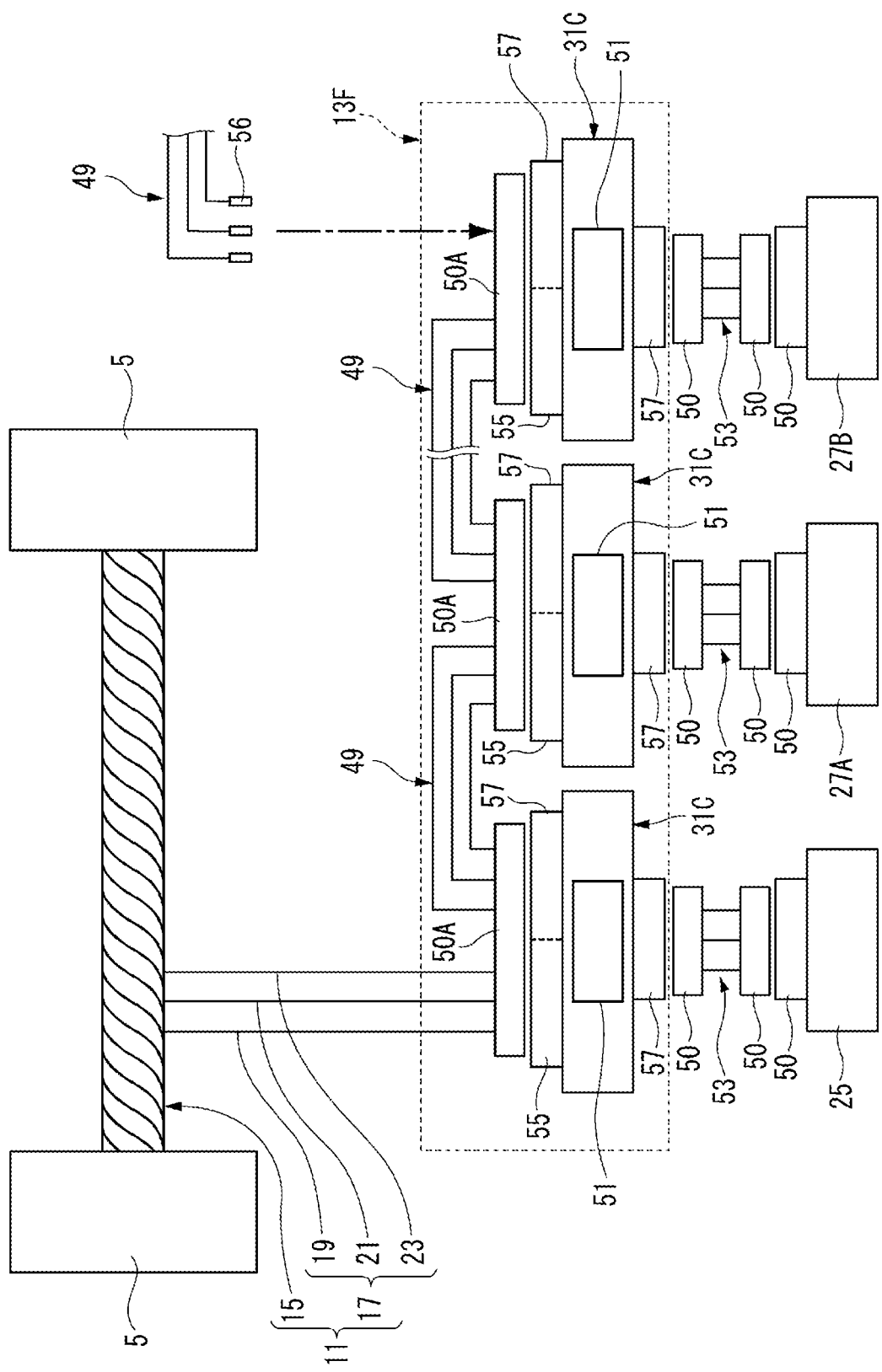
FIG. 13 is a schematic view of a wire harness structure of Modification 6 according to the second embodiment of the present invention.

In addition, in a wire harness structure of Modification 6 according to the second embodiment of the present invention, as shown in FIG. 13, a branch connection mechanism 13F is provided with a plurality of branch connection members 31C. Each of the branch connection members 31C has an input connector portion 55, and a pair of output connector portions 57 that are branched from the input connector portion 55 electrically conductive thereto. Further, the input connector portion 55 and one of the output connector portions 57 that is electrically connected to an input connector portion 55 of another branch connection member 31C are provided inside a single connector housing.

A connector 50A is fitted to the input connector portion 55 and the output connector portion 57 that are provided inside the single connector housing. The connector 50A is made of a single connector housing to which an end portion of a branch harness 17 and end portions of connection conductors 49 are attached correspondingly to the input connector portion 55 and the output connector portion 57 respectively. That is, when the connector 50A in which terminals 56 connected to the end portion of the branch harness 17 or the end portions of the connection conductors 49 are inserted and fixed into predetermined terminal receiving chambers in the signal connector housing respectively is fitted to the branch connection member 31C, the branch harness 17 or the connection conductors 49 are electrically connected to the corresponding input connector portion 55 or the corresponding output connector portion 57.

In the branch connection member 31C on an upstream side (left side in FIG. 13), one of the output connector portions 57 is connector-connected to an electrical device 25. The connector 50A into which the end portion of the branch harness 17 in a main harness 11 and one ends of the connection conductors 49 are inserted and fixed is connector-connected to the branch connection member 31C electrically connected to the electrical device 25. Thus, the end portion of the branch harness 17 is electrically connected to the input connector portion 55 and the one ends of the aforementioned connection conductors 49 are electrically connected to the other output connector portion 57. The other output connector portion 57 in the branch connection member 31C is electrically connected to an input connector portion 55 of another branch connection member 31C on a downstream side (at the center in FIG. 13).

A connector 50A into which the other ends of the aforementioned connection conductors 49 and one ends of connection conductors 49 on the downstream side are inserted and fixed is connector-connected to the other branch connection member 31C. Thus, the other ends of the aforementioned connection conductors 49 are electrically connected to the input connector portion 55, and the one ends of the connection conductors 49 on the downstream side are electrically connected to the other output connector portion 57. In the other branch connection member 31C, one output connector portion 57 is electrically connected to an additional electrical device 27A. The other output connector portion 57 of the other branch connection member 31C is electrically connected to an input connector portion 55 of further another branch connection member 31C on a further downstream side (right side in FIG. 13).

A connector 50A into which the one ends of the connection conductors 49 on the aforementioned downstream side are inserted and fixed is connector-connected to the further other branch connection member 31C. Thus, the other ends of the connection conductors 49 on the aforementioned downstream side are electrically connected to the input connector portion 55. One of output connector portions 57 of the further other branch connection member 31C is electrically connected to an additional electrical device 27B.

Thus, in the wire harness structure of the Modification 6, the connector 50A made of the signal connector housing is only connector-connected to connector portions (the input connector portion 55 and the other output connector portion 57 provided inside the single connector housing) of each branch connection member 31C in which one output connector portion 57 is electrically connected to the electrical device 25 or the additional electrical device 27A, 27B. Thus, the electrical device 25 and the additional electrical device 27A, 27B can be electrically connected easily. In addition, each branch connection member 31C in the branch connection mechanism 13F may be connected to or disconnected from the connector 50A. Thus, the branch connection member 31C can be replaced easily.

Incidentally, when further another branch connection member 31C is added to a downstream side of the branch connection member 31C on the right side in FIG. 13, one ends (terminals 56) of connection conductors 49 the other ends of which are electrically connected to an input connector portion 55 of the further other branch connection member 31C are inserted and fixed into empty terminal receiving chambers of the connector 50A. Thus, the further other branch connection member 31C can be electrically connected easily.

That is, in the wire harness structure of the Modification 6, the electrical device 25 and the additional electrical devices 27A and 27B are collectively and respectively connector-connected to the three connectors 50A which are configured integrally with the branch harness 17 through the connection conductors 49. Further, when one of other branch connection members 31 to 31C is added, terminals 56 electrically connected to one ends of connection conductors 49 which are electrically connected to the branch connection member 31 to 31C are inserted and fixed into empty terminal receiving chambers of the most downstream connector 50A.

Next, a third embodiment of a wire harness structure according to the present invention will be described.

Figure 14:
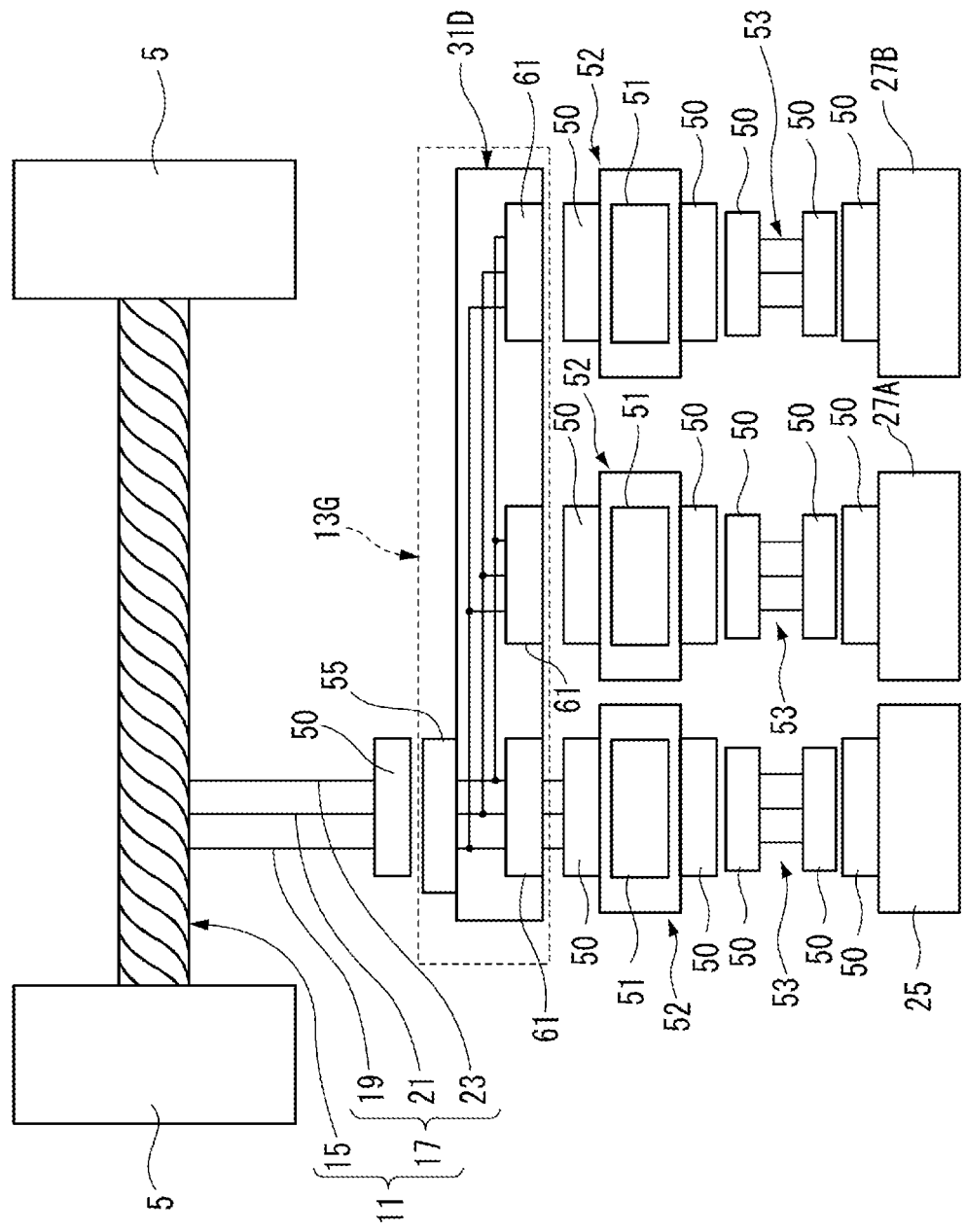
FIG. 14 is a schematic view of a wire harness structure according to a third embodiment of the present invention.

FIG. 14 is a schematic view of the wire harness structure according to the third embodiment of the present invention.

In a branch connection mechanism 13G of the wire harness structure according to the third embodiment, a branch connection member 31D is provided with branch output connector portions 61 and an input connector portion 55, as shown in FIG. 14. Two of the branch output connector portions 61 are provided to be electrically connected to an electrical device 25 and an additional electrical device 27A respectively. The input connector portion 55 is collectively electrically conductive to the branch output connector portions 61. The input connector portion 55 is connector-connected to a power supply wire 19, a communication wire 21 and a ground wire 23 in a branch harness 17 which is a main harness 11.

Figure 15:
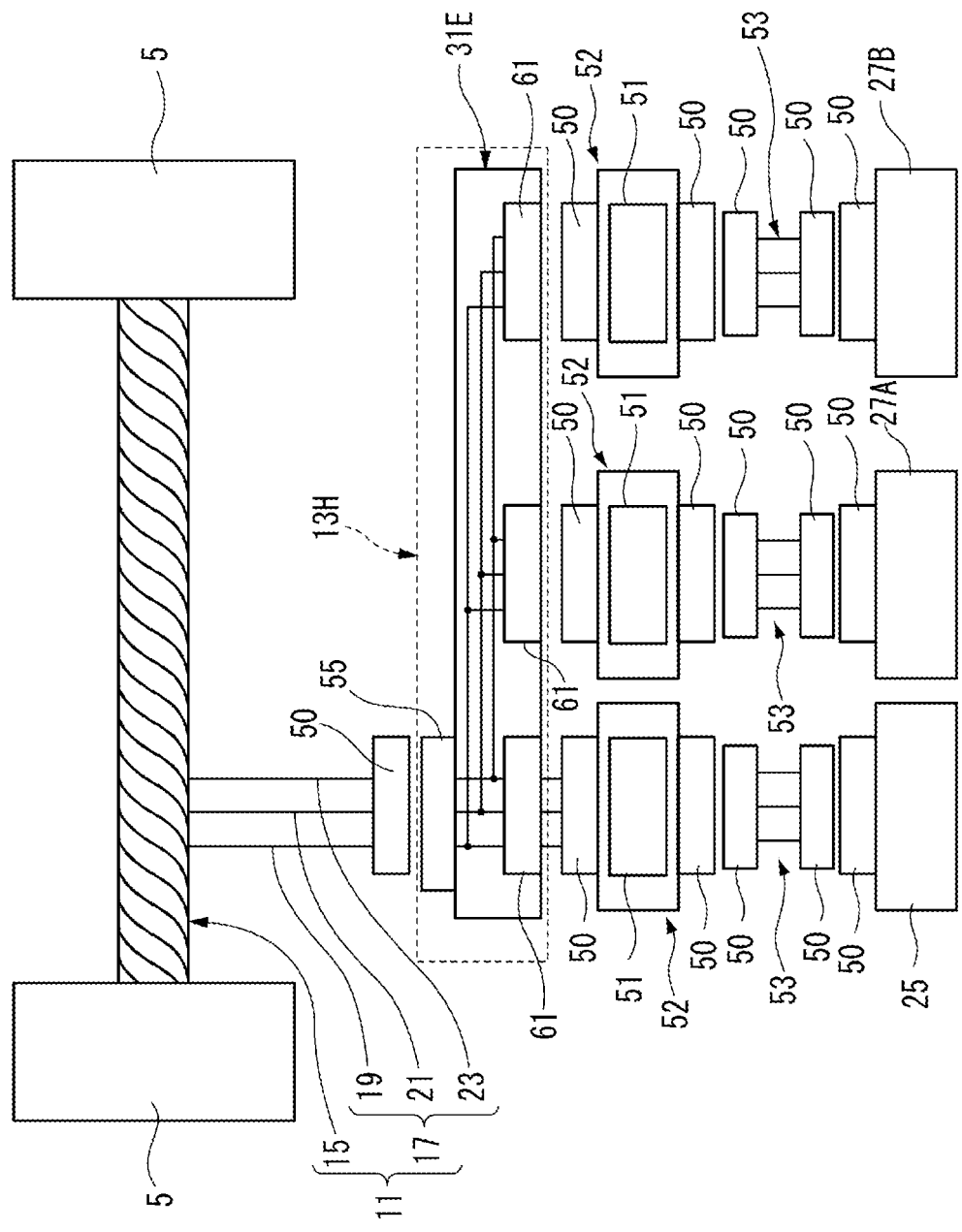
FIG. 15 is a schematic view of a wire harness structure of Modification 7 according to the third embodiment of the present invention.

FIG. 15 is a schematic view of a wire harness structure of Modification 7 according to the third embodiment, in which a branch connection member 31E having three branch output connector portions 61 is used.

In a branch connection mechanism 13H of the wire harness structure according to the third embodiment, the branch connection member 31E may be provided with four or more branch output connector portions 61. In this case, an electrical device 25 and additional electrical devices 27A and 27B are connector-connected in order from the first branch output connector portion 61 on an upstream side. Incidentally, in the illustrated example, through control connector portions 52 each having a control function portion 51, the branch output connector portion 61 and the electrical device 25 are connector-connected to each other, and the branch output connector portions 61 and the additional electrical devices 27A and 27B are connector-connected to each other respectively.

Figure 16:
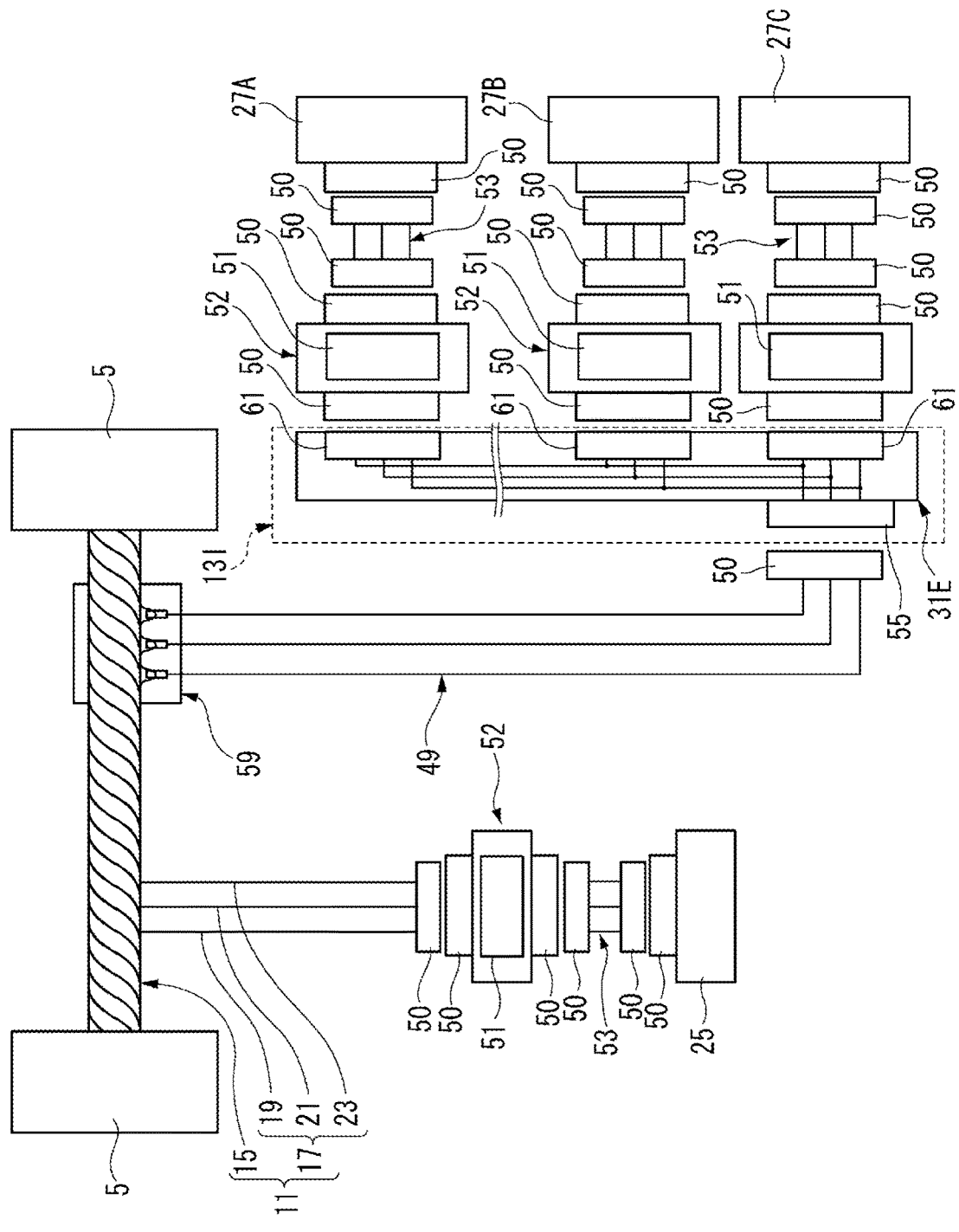
FIG. 16 is a schematic view of a wire harness structure of Modification 8 according to the third embodiment of the present invention.
Figure 17:
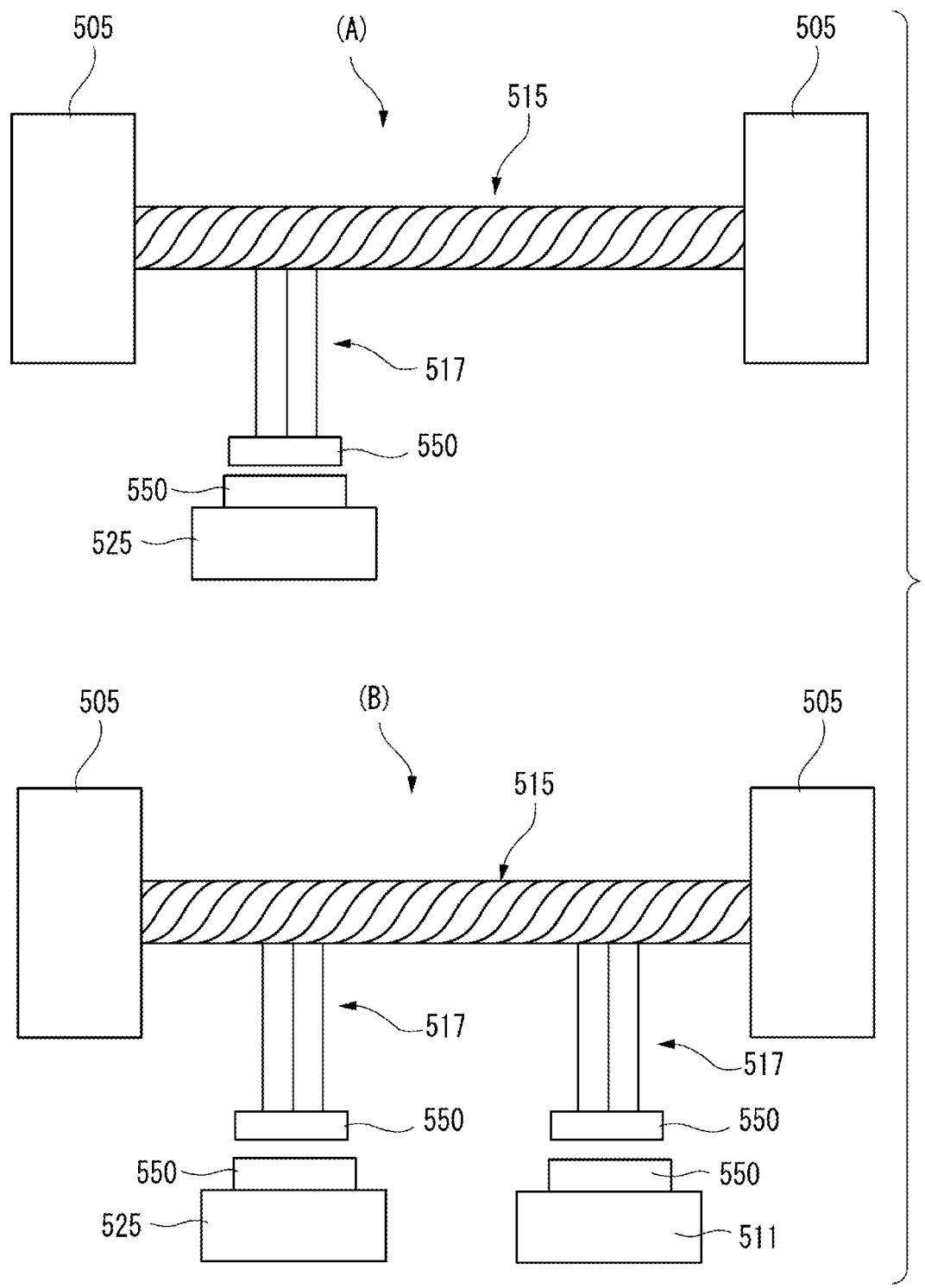
FIG. 17 is a schematic view of a background-art wire harness structure having two item numbers based on presence/absence of an additional load.
Figure 18:
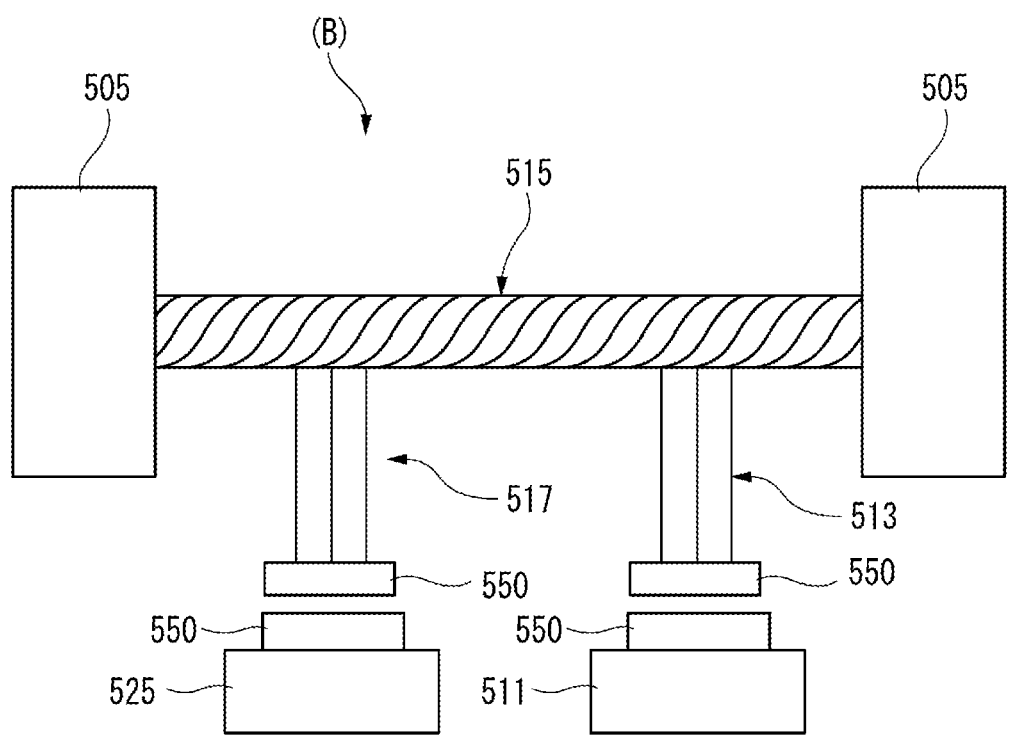
FIG. 18 is a schematic view of the background-art wire harness structure, in which a part of wire harnesses is made to be discarded.

FIG. 16 is a schematic view of a wire harness structure of Modification 8 according to the third embodiment of the present invention, in which a branch connection member 31E having three branch output connector portions 61 are connected to a trunk harness 15.

In the wire harness structure of Modification 8 according to the third embodiment, a connector 50 on connection conductors 49 one ends of which are connected by pressure contact with conductors of a branch connection portion 59 provided in the trunk harness 15 is connector-connected to an input connector portion 55 of the branch connection member 31E. A branch connection mechanism 13I in this case is directly electrically connected to the trunk harness 15 without interposition of a branch harness 17 therebetween.

In the wire harness structure according to the third embodiment, when the input connector portion 55 of the branch connection member 31D (31E) is electrically connected to conductors of a main harness 11 (the trunk harness 15 or the branch harness 17), all the branch output connector portions 61 provided in the branch connection member 31D (31E) are in an electrically conductive connection state to the conductors of the main harness 11. Thus, by suitable selection of one from a plurality of types of branch connection members 31D (31E) different in the number of branch output connector portions 61, a desired number of additional electrical devices 27A to 27C can be added easily without any waste. In addition, the electrical device 25 and the additional electrical devices 27A to 27C may be only connected to or disconnected from the branch output connector portions 61. Thus, the electrical device 25 and the additional electrical devices 27A to 27C can be replaced easily.

Consequently, according to the wire harness structure according to the present embodiment, it is possible to cope with a wide variety of wire harness item numbers and it is possible to eliminate discard of a wire harness.

Here, the aforementioned characteristics of the embodiments of the wire harness structure according to the present invention will be briefly summarized and listed as follows respectively.

[1] A wire harness structure including:
a main harness (11, 11A) that has a trunk harness (15, 15A) routed on a vehicle, and has at least one branch harness (17) having one end branch-connected to the trunk harness (15, 15A) and the other end electrically connected to an electrical device (25) standardly mounted on the vehicle; and a branch connection mechanism (13, 13A to 13I) to which at least one additional electrical device (27A to 27F) additionally mounted on the vehicle is electrically connected, and which is connected in a retrofitting manner as a branch to the at least one branch harness connected to the electrical device.

[2] A wire harness structure according to the aforementioned configuration [1], wherein:
the branch connection mechanism (13, 13A, 13B) is provided with a branch connection member (31, 31A) that has at least one branch conductor (33) to which the additional electrical device is electrically branch-connected, and a pair of connection portions (pressure contact portions 35) that are provided at opposite end portions of the branch conductor and disposed on an insulating substrate; and one end of a connection conductor (49) the other end of which is connected to one of the connection portions is connected to the at least one branch harness (17) which is connected to the electrical device (25).

[3] A wire harness structure according to the aforementioned configuration [1], wherein:

the branch connection mechanism (13C, 13D, 13E, 13F) is provided with a plurality of branch connection members (31B, 31C) each of which has an input connector portion (55), and a pair of output connector portions (57) branched from the input connector portion electrically conductive thereto; and in one of the branch connection members having one of the output connector portions connected to the electrical device, the input connector portion is connected to the at least one branch harness (17) which is connected to the electrical device (25), and the other output connector portion is connector-connected to the input connector portion in another of the branch connection members in which one of the output connector portions is connected to the additional electrical device.

[4] A wire harness structure according to the aforementioned configuration [1], wherein:

the branch connection mechanism (13G) is provided with a branch connection member (31D) that has a plurality of branch output connector portions (61) connected to the electrical device and the additional electrical device respectively, and an input connector portion (55) collectively electrically conductive to the branch output connector portions; and the at least one branch harness (17) which is connected to the electrical device (25) is connected to the input connector portion.

[5] A wire harness structure according to any one of the aforementioned configurations [1] to [3], wherein:

the branch connection mechanism (13, 13A to 13F) has a control function portion (51) for controlling the electrical device (25) or the additional electrical device (27A to 27F).

Incidentally, the present invention is not limited to the aforementioned embodiments but change, modification etc. can be made on the present invention suitably. Moreover, the materials, shapes, dimensions, numbers, arrangement places, etc. of the constituent elements in the aforementioned embodiments are not limited but can be set desirably as long as they can achieve the present invention.

According to the wire harness structure according to the present invention, it is possible to cope with a wide variety of wire harness item numbers, and it is possible to eliminate discard of a wire harness. Accordingly, it is possible to reduce manufacturing cost.

The invention claimed is:

1. A wire harness structure comprising:
a main harness including:
a trunk harness which is routed on a vehicle; and
at least one branch harness having one end connected to the trunk harness as a branch and the other end electrically connected to an electrical device mounted on the vehicle; and
a branch connection mechanism to which at least one additional electrical device additionally mounted on the vehicle is electrically connected, and which is connected in a retrofitting manner as a branch to the at least one branch harness connected to the electrical device,
wherein the branch connection mechanism includes a branch connection member that has at least one branch conductor to which the additional electrical device is electrically connected as a branch, and has a pair of connection portions that are provided at opposite end portions of the branch conductor and disposed on an insulating substrate; and
wherein one end of a connection conductor the other end of which is connected to one of the connection portions is connected to the at least one branch harness which is connected to the electrical device.

2. The wire harness structure according to claim 1, wherein the branch connection mechanism has a control function portion configured to control the electrical device or the additional electrical device.

3. A wire harness structure comprising:
a main harness including:
a trunk harness which is routed on a vehicle; and
at least one branch harness having one end connected to the trunk harness as a branch and the other end electrically connected to an electrical device mounted on the vehicle; and
a branch connection mechanism to which at least one additional electrical device additionally mounted on the vehicle is electrically connected, and which is connected in a retrofitting manner as a branch to the at least one branch harness connected to the electrical device,
wherein the branch connection mechanism includes a plurality of branch connection members each of which has an input connector portion and a pair of output connector portions branched from the input connector portion and electrically conductive thereto; and
wherein in one of the branch connection members having one of the output connector portions connected to the electrical device, the input connector portion is connected to the at least one branch harness connected to the electrical device, and the other output connector portion is connected to the input connector portion in another of the branch connection members in which one of the output connector portion is connected to the additional electrical device.

4. The wire harness structure according to claim 3, wherein the branch connection mechanism has a control function portion configured to control the electrical device or the additional electrical device.

5. A wire harness structure comprising:
a main harness including:
a trunk harness which is routed on a vehicle; and
at least one branch harness having one end connected to the trunk harness as a branch and the other end electrically connected to an electrical device mounted on the vehicle; and
a branch connection mechanism to which at least one additional electrical device additionally mounted on the vehicle is electrically connected, and which is connected in a retrofitting manner as a branch to the at least one branch harness connected to the electrical device,
wherein the branch connection mechanism includes a branch connection member that has a plurality of branch output connector portions connected to the electrical device and the additional electrical device respectively, and has an input connector portion collectively and electrically conductive to the branch output connector portions; and
wherein the at least one branch harness connected to the electrical device is connected to the input connector portion.

6. The wire harness structure according to claim 5, wherein the branch connection mechanism has a control function portion configured to control the electrical device or the additional electrical device.

\* \* \* \* \*